United States Patent

(12) United States Patent
Ohkubo et al.

(10) Patent No.: US 12,717,129 B2
(45) Date of Patent: Aug. 25, 2026

(54) OPTICAL SCANNING DEVICE AND IMAGE FORMING APPARATUS

(71) Applicant: SHARP KABUSHIKI KAISHA, Sakai City (JP)

(72) Inventors: Kenzo Ohkubo, Sakai City (JP); Takayuki Ohno, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 329 days.

(21) Appl. No.: 18/382,645

(22) Filed: Oct. 23, 2023

(65) Prior Publication Data

US 2024/0201482 A1 Jun. 20, 2024

(30) Foreign Application Priority Data

Dec. 16, 2022 (JP) ................................ 2022-201417

(51) Int. Cl.

| | |
|---|---|
| ***G02B 26/08*** | (2006.01) |
| ***G02B 26/10*** | (2006.01) |
| ***G02B 26/12*** | (2006.01) |
| ***G03G 15/043*** | (2006.01) |

(52) U.S. Cl.

CPC ......... *G02B 26/123* (2013.01); *G02B 26/105* (2013.01); *G03G 15/0435* (2013.01)

(58) Field of Classification Search

CPC .. G02B 26/123; G02B 26/105; G02B 26/124; G03G 15/0435

See application file for complete search history.

(56) References Cited

U.S. PATENT DOCUMENTS

| | | | | |
|---|---|---|---|---|
| 2013/0293659 A1* | 11/2013 | Suzuki | ................ | G02B 26/123 359/221.2 |
| 2020/0041924 A1* | 2/2020 | Mizutani | .............. | G03G 15/043 |
| 2020/0233332 A1* | 7/2020 | Kuribayashi | ...... | G03G 15/0409 |

FOREIGN PATENT DOCUMENTS

| | | |
|---|---|---|
| JP | 2012-037741 A | 2/2012 |

* cited by examiner

*Primary Examiner* — Euncha P Cherry

(74) *Attorney, Agent, or Firm* — ScienBiziP, P.C.

(57) ABSTRACT

A rotational direction of a multi-beam light source around a rotational axis is made different to a side where a sub-scanning width in a sub-scanning direction of a plurality of light beams is made smaller between a case of one-side incidence in which the plurality of light beams are made incident to the rotary polygon mirror from either one of sides in the rotary axis direction of a rotary polygon mirror and a case of the other-side incidence in which the plurality of light beams are made incident to the rotary polygon mirror from the other side.

6 Claims, 17 Drawing Sheets

REFERENCE POSITION ALONG REFERENCE VIRTUAL LINE

ROTATION IN CLOCKWISE DIRECTION FROM REFERENCE POSITION AS VIEWED FROM SIDE OPPOSITE TO LIGHT EMISSION SIDE (REAR SIDE)

ROTATION IN COUNTERCLOCKWISE DIRECTION FROM REFERENCE POSITION AS VIEWED FROM SIDE OPPOSITE TO LIGHT EMISSION SIDE (REAR SIDE)

FIG. 14

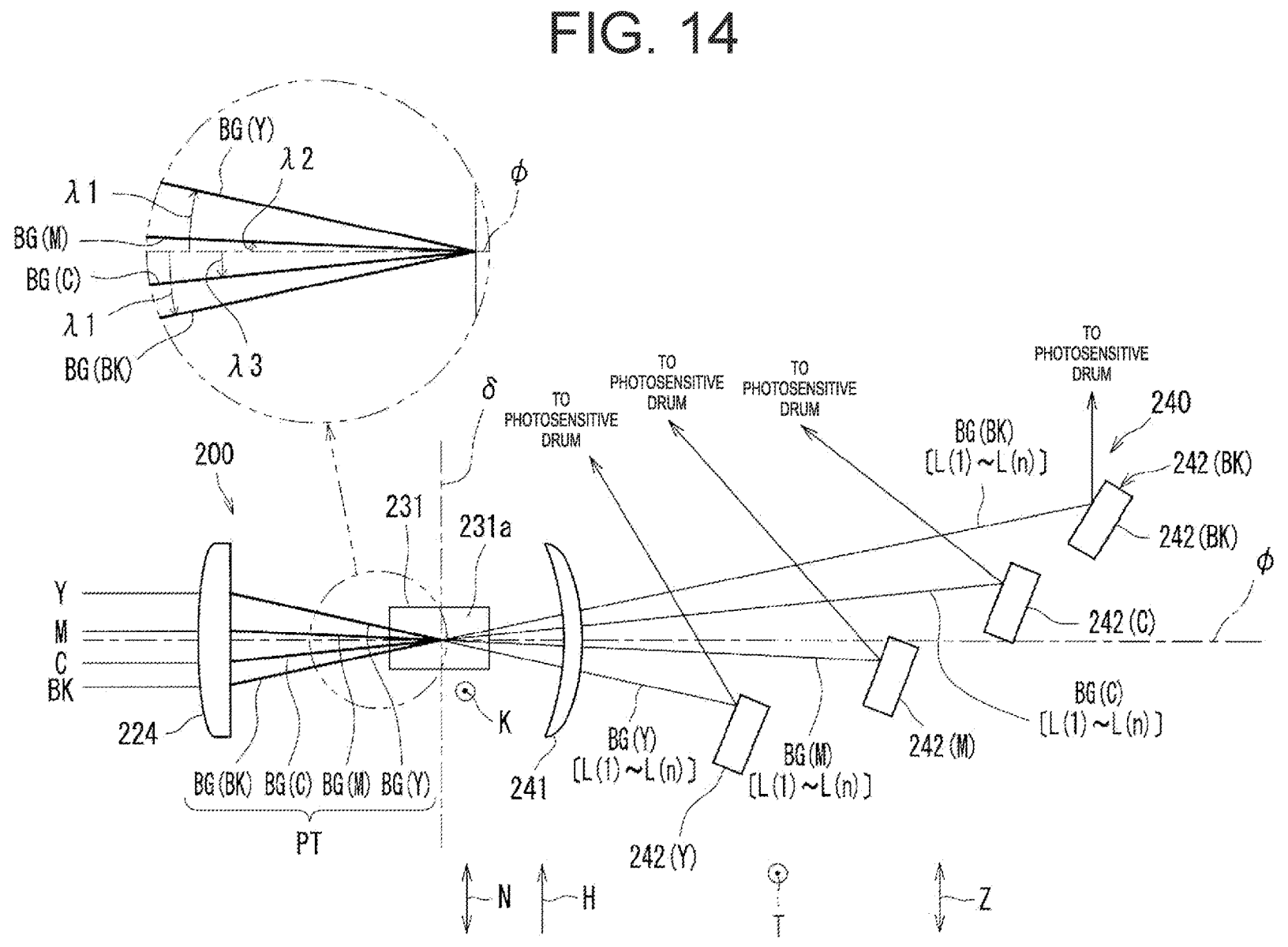

φ
240
242 (BK)
242 (BK)
TO PHOTOSENSITIVE DRUM
242 (C)
BG (C) [L(1) ~ L(n)]
BG (BK) [L(1) ~ L(n)]
Z
242 (M)
TO PHOTOSENSITIVE DRUM
BG (M) [L(1) ~ L(n)]
T
TO PHOTOSENSITIVE DRUM
242 (Y)
BG (Y) [L(1) ~ L(n)]
TO PHOTOSENSITIVE DRUM
H
241
N
δ
231a
K
231
BG (Y)
BG (M)
BG (C)
BG (BK)
PT
200
224
Y
M
C
BK
φ
λ 2
BG (Y)
λ 3
λ 1
BG (M)
BG (C)
λ 1
BG (BK)

OPTICAL SCANNING DEVICE AND IMAGE FORMING APPARATUS

BACKGROUND OF THE INVENTION

Field of the Invention

The present disclosure relates to an optical scanning device and an image forming apparatus such as a copying machine, a multifunction peripheral, a printer, or a facsimile machine.

Description of the Background Art

As the optical scanning device, for example, a device including a multi-beam light source having a plurality of light emitting elements aligned in parallel in a predetermined linear direction is used in some cases.

The optical scanning device including the multi-beam light source includes a rotary polygon mirror (polygon mirror) and a reflection mirror along a rotary axis direction of the rotary polygon mirror, in which a plurality of light beams respectively emitted from a plurality of light emitting elements are reflected by a reflection mirror, the plurality of light beams reflected by the reflection mirror are made incident to the rotary polygon mirror, and the plurality of light beams reflected by the rotary polygon mirror are emitted toward an object to be scanned (an image carrier such as a photosensitive drum). In this way, the plurality of light beams emitted from each of the plurality of light emitting elements can be caused to scan a surface to be scanned of the object to be scanned in a main-scanning direction.

In the optical scanning device as above, the multi-beam light source is, for example, capable of rotational adjustment around a rotational axis along an emission direction of the plurality of light beams. As a result, the multi-beam light source can adjust a sub-scanning width in a sub-scanning direction of a plurality of beam spots scanned in the main-scanning direction on the surface to be scanned of the object to be scanned by the plurality of light beams (the entire width in the sub-scanning direction of the plurality of light beams).

Meanwhile, there are a case of one-side incidence (lower-side incidence) in which the plurality of light beams are made incident to the rotary polygon mirror from either one of sides in the rotary axis direction of the rotary polygon mirror (lower side when the rotary axis direction of the rotary polygon mirror is regarded as an up-down direction) and a case of the other-side incidence (upper-side incidence) in which the plurality of light beams are made incident to the rotary polygon mirror from the other side (upper side). In this case, depending on a rotational direction around the rotational axis when the multi-beam light source is rotationally adjusted, a difference in an optical path length between a predetermined reference optical path position (a position of a cylindrical lens, for example) of the light beams from the plurality of light emitting elements and a mirror surface of a reflection mirror increases between the light emitting elements at both end parts and then, a deviation amount from a targeted target position (a center part in the rotary axis direction) of the reflection surface of the rotary polygon mirror, that is, a sub-scanning width of the plurality of optical beams becomes larger, which incurs deterioration of resolution in some cases. The higher a high resolution becomes (to 2400 dpi or more, for example), that is, the smaller a dot diameter becomes (to 10.6 μm or less, for example), the more conspicuous it becomes. Here, the reference optical path position is an optical path position where there is no optical member such as a mirror on an upstream side of the reflection mirror in the emission direction, that is, an optical path position where the plurality of light beams are directly made incident to the reflection mirror.

Thus, an object of the present disclosure is to provide an optical scanning device and an image forming apparatus capable of reducing a sub-scanning width in a sub-scanning direction of a plurality of light beams on a reflection surface of a rotary polygon mirror when a multi-beam light source is rotationally adjusted, whereby deterioration of resolution can be suppressed.

SUMMARY OF THE INVENTION

In order to solve the aforementioned problem, an optical scanning device according to the present disclosure is an optical scanning device including a multi-beam light source having a plurality of light emitting elements aligned in parallel in a predetermined linear direction, a rotary polygon mirror, and a reflection mirror along a rotary axis direction of the rotary polygon mirror, in which a plurality of light beams emitted from each of the plurality of light emitting elements are reflected by the reflection mirror, the plurality of light beams reflected by the reflection mirror are made incident to the rotary polygon mirror, and the plurality of light beams reflected by the rotary polygon mirror are emitted toward an object to be scanned, characterized in that the multi-beam light source is capable of rotational adjustment around a rotational axis along an emission direction of the plurality of light beams, and a rotational direction of the multi-beam light source around the rotational axis is made different to a side where a sub-scanning width in a sub-scanning direction of the plurality of light beams is made smaller between a case of one-side incidence in which the plurality of light beams are made incident to the rotary polygon mirror from either one of sides in the rotary axis direction of the rotary polygon mirror and a case of the other-side incidence in which the plurality of light beams are made incident to the rotary polygon mirror from the other side.

Moreover, the image forming apparatus according to the present disclosure is characterized by including an optical scanning device according to the present disclosure.

According to the present disclosure, the sub-scanning width in the sub-scanning direction of the plurality of light beams on the reflection surface of the rotary polygon mirror can be made smaller when the multi-beam light source is rotationally adjusted, whereby deterioration of resolution can be suppressed.

BRIEF DESCRIPTION OF THE DRAWINGS

FIG. 2 is a schematic plan view schematically illustrating a part of an optical system of the optical scanning device shown in FIG. 1.

FIG. 14 is a diagram schematically illustrating another example of an optical path of each beam group in the optical scanning device shown in FIG. 1.

DESCRIPTION OF THE PREFERRED EMBODIMENTS

Figure 1:
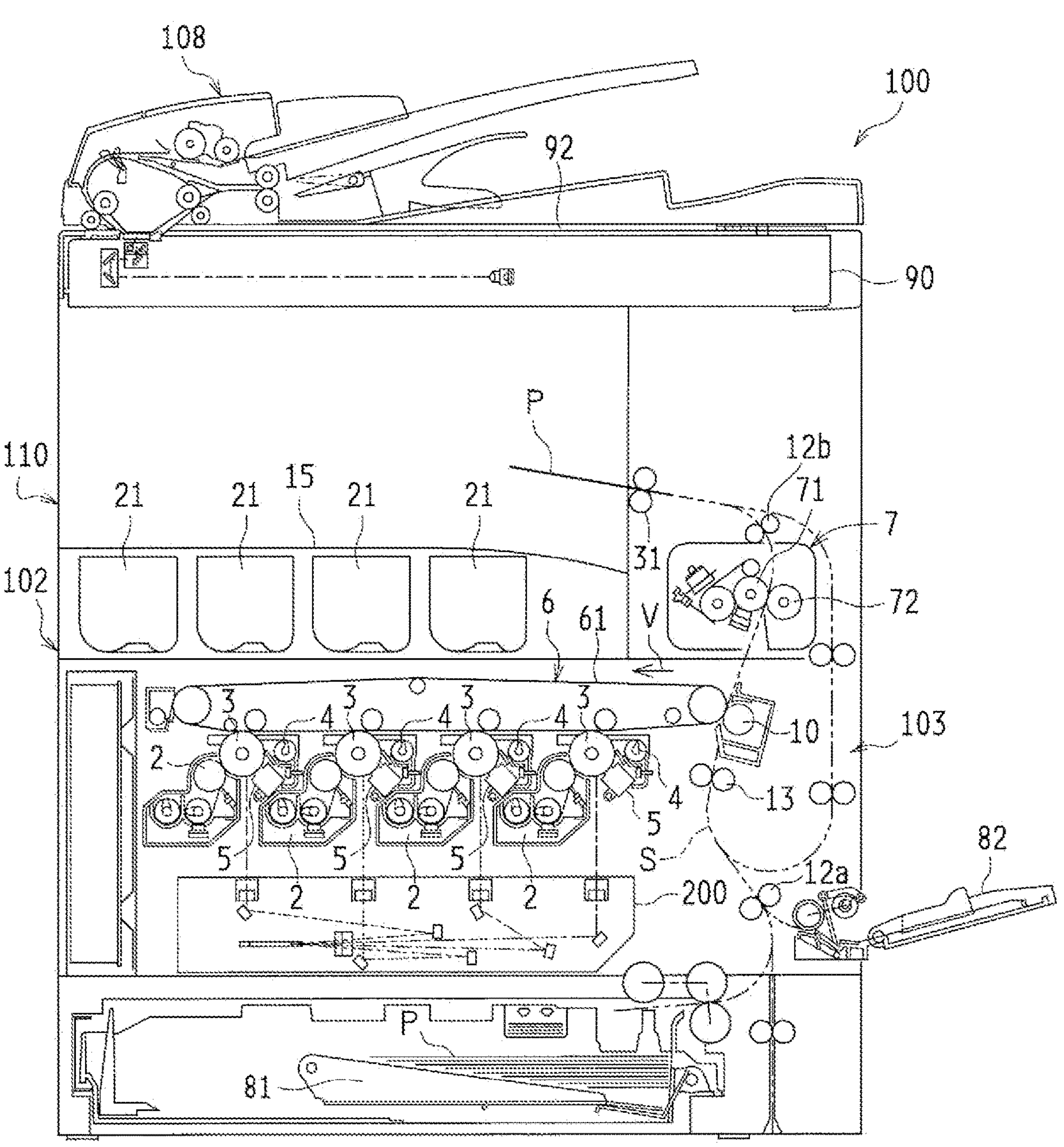
FIG. 1 is a schematic sectional view of an image forming apparatus including an optical scanning device according to an embodiment.

An embodiment of the present disclosure will be described below with reference to the drawings. In the following description, the same reference numerals are given to the same components. They have the same names and functions. Therefore, detailed descriptions thereof will not be repeated.

Overall Configuration of Image Forming Apparatus

FIG. 1 is a schematic sectional view of an image forming apparatus 100 including an optical scanning device 200 according to this Embodiment. The image forming apparatus 100 according to this Embodiment is a color image forming apparatus. The image forming apparatus 100 forms a multicolor or monochromatic image on a sheet P such as recording paper in accordance with image data read by a manuscript reading device 108 or image data transmitted from outside. It is to be noted that the image forming apparatus 100 may be a monochrome image forming apparatus. Alternatively, the image forming apparatus 100 may be a color image forming apparatus in another form.

The image forming apparatus 100 includes the manuscript reading device 108 and an image forming apparatus main-body 110, and in the image forming apparatus main-body 110, an image former 102 and a sheet conveyance system 103 are provided.

The image former 102 includes the optical scanning device 200, a plurality of developing devices 2 to 2, a plurality of photosensitive drums 3 to 3 acting as electrostatic latent image carriers, a plurality of cleaning devices 4 to 4, a plurality of charging devices 5 to 5, an intermediate transfer belt device 6, a plurality of toner cartridge devices 21 to 21, and a fixing device 7. Moreover, the sheet conveyance system 103 includes a paper feed tray 81, a manual paper-feed tray 82, and an ejection tray 15.

A manuscript table 92 made of transparent glass on which a manuscript (not shown) is placed is provided on an upper part of the image forming apparatus main-body 110. The image reading device 90 that reads an image of a manuscript is provided on a lower part of the manuscript table 92. Moreover, the manuscript reading device 108 is provided on the upper side of the manuscript table 92. The image of the manuscript read by the manuscript reading device 108 is sent to the image forming apparatus main-body 110 as image data, and the image formed on the basis of the image data in the image forming apparatus main-body 110 is recorded on the sheet P.

The image data handled in the image forming apparatus 100 corresponds to a color image using a plurality of colors (in this example, of black (BK), cyan (C), magenta (M), and yellow (Y)). Therefore, the developing devices 2 to 2, the photosensitive drums 3 to 3, the cleaning devices 4 to 4, the charging devices 5 to 5, and the toner cartridge devices 21 to 21 are set in plural (provided in four each in this example, that is, black, cyan, magenta, and yellow), respectively, so as to form a plurality of types (four types in this example) of images corresponding to the respective colors.

In the image forming apparatus 100, when image formation is performed, the sheet P is supplied from the paper feed tray 81 or the manual paper-feed tray 82, and is conveyed to a resist roller 13 by a first conveyance roller 12*a* provided along a sheet conveyance path S. Subsequently, in the intermediate transfer belt device 6, the sheet P is conveyed by a transfer roller 10 at a timing when the toner image on an intermediate transfer belt 61 circumferentially moved in a circumferential direction V is integrated, and the toner image is transferred onto the sheet P. Thereafter, the sheet P passes through a fixing roller 71 and a pressure roller 72 in the fixing device 7. At this time, an unfixed toner on the sheet P is melted and fixed by heat. Then, the sheet P on which the toner image is formed is ejected onto the ejection tray 15 via a second conveyance roller 12*b* and an ejection roller 31.

Optical Scanning Device

Figure 2:
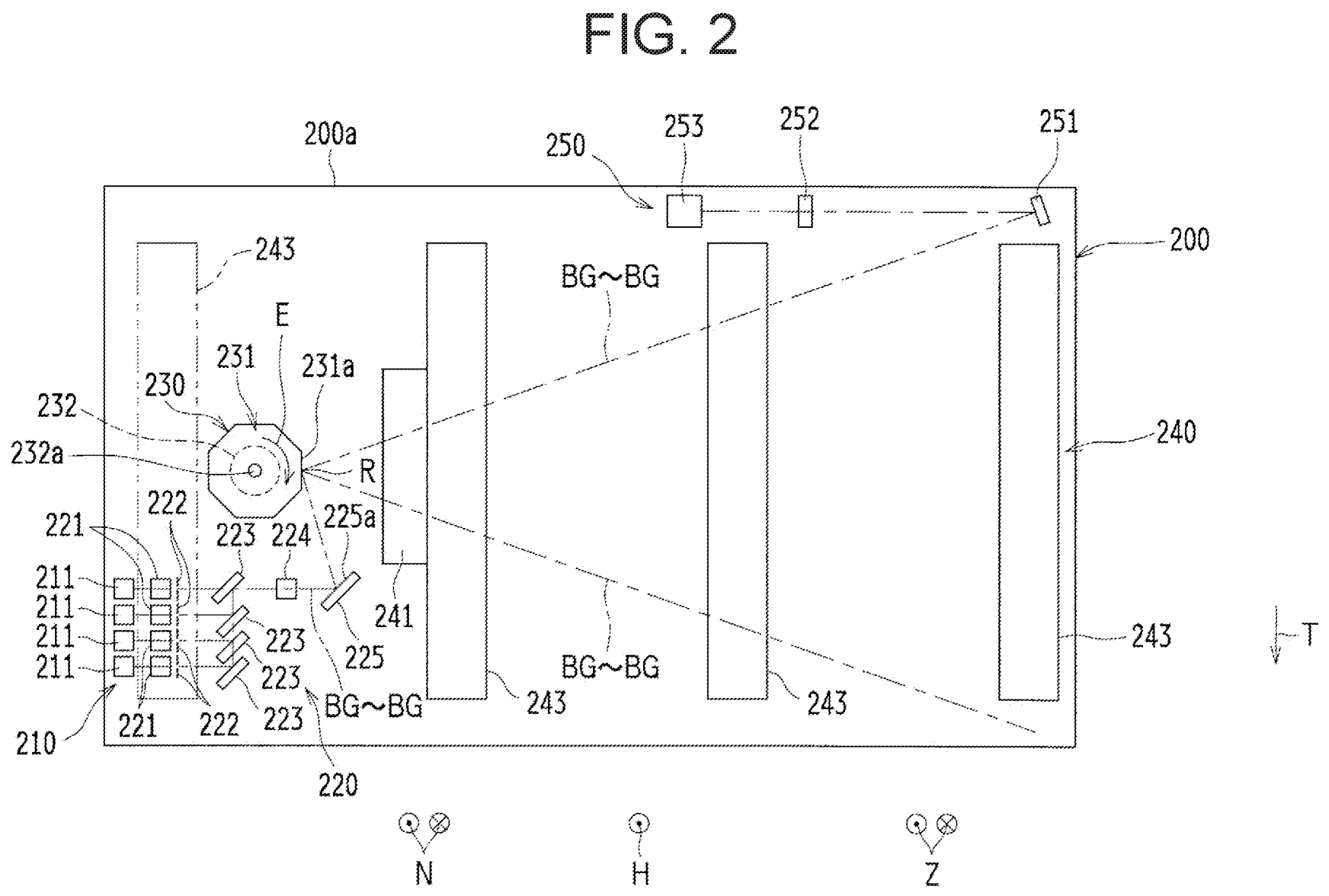
Figure 3:
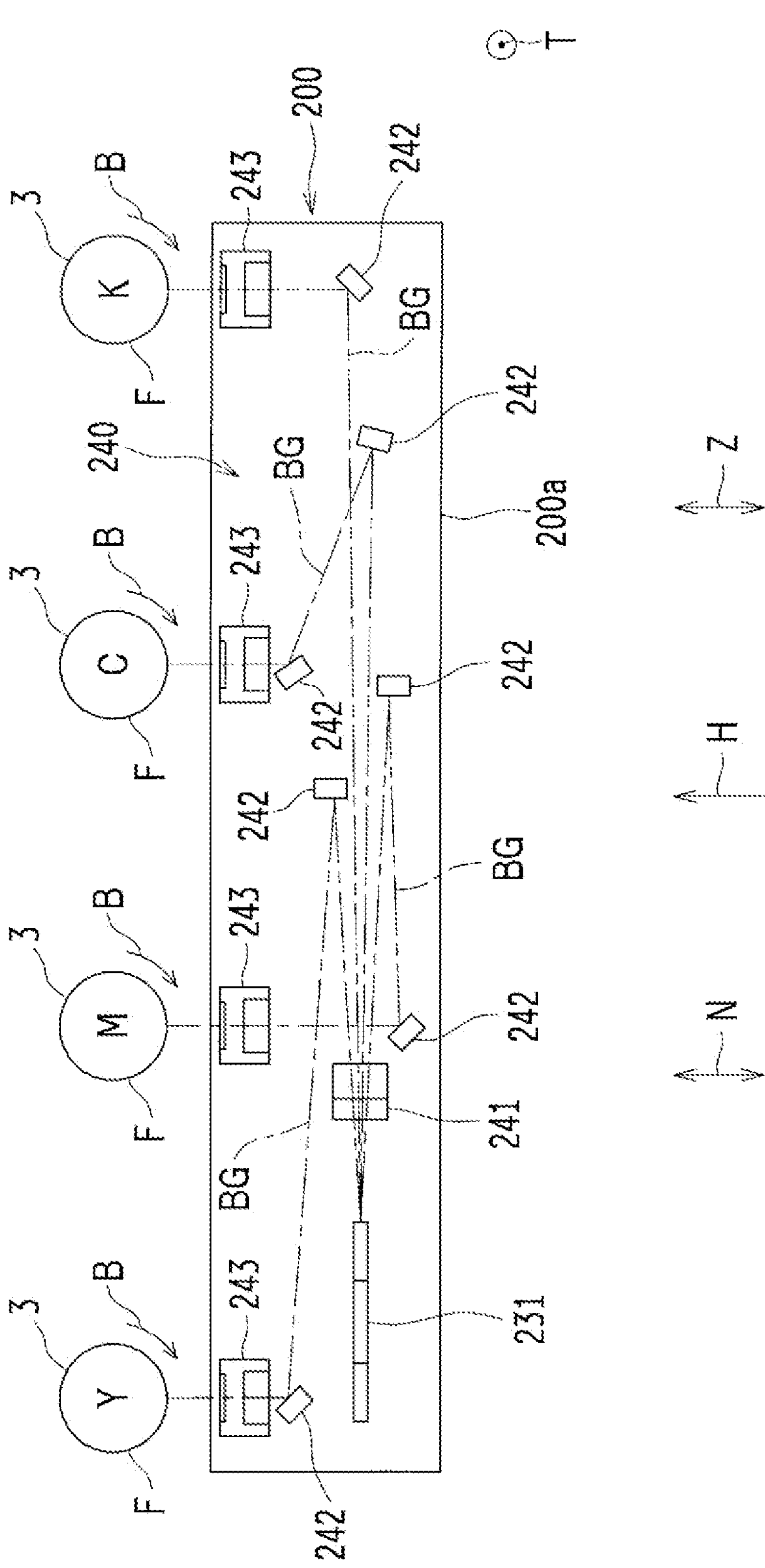
FIG. 3 is a schematic side view illustrating a part of the optical system of the optical scanning device shown in FIG. 1 together with a positional relationship with a photosensitive drum.
Figure 4:
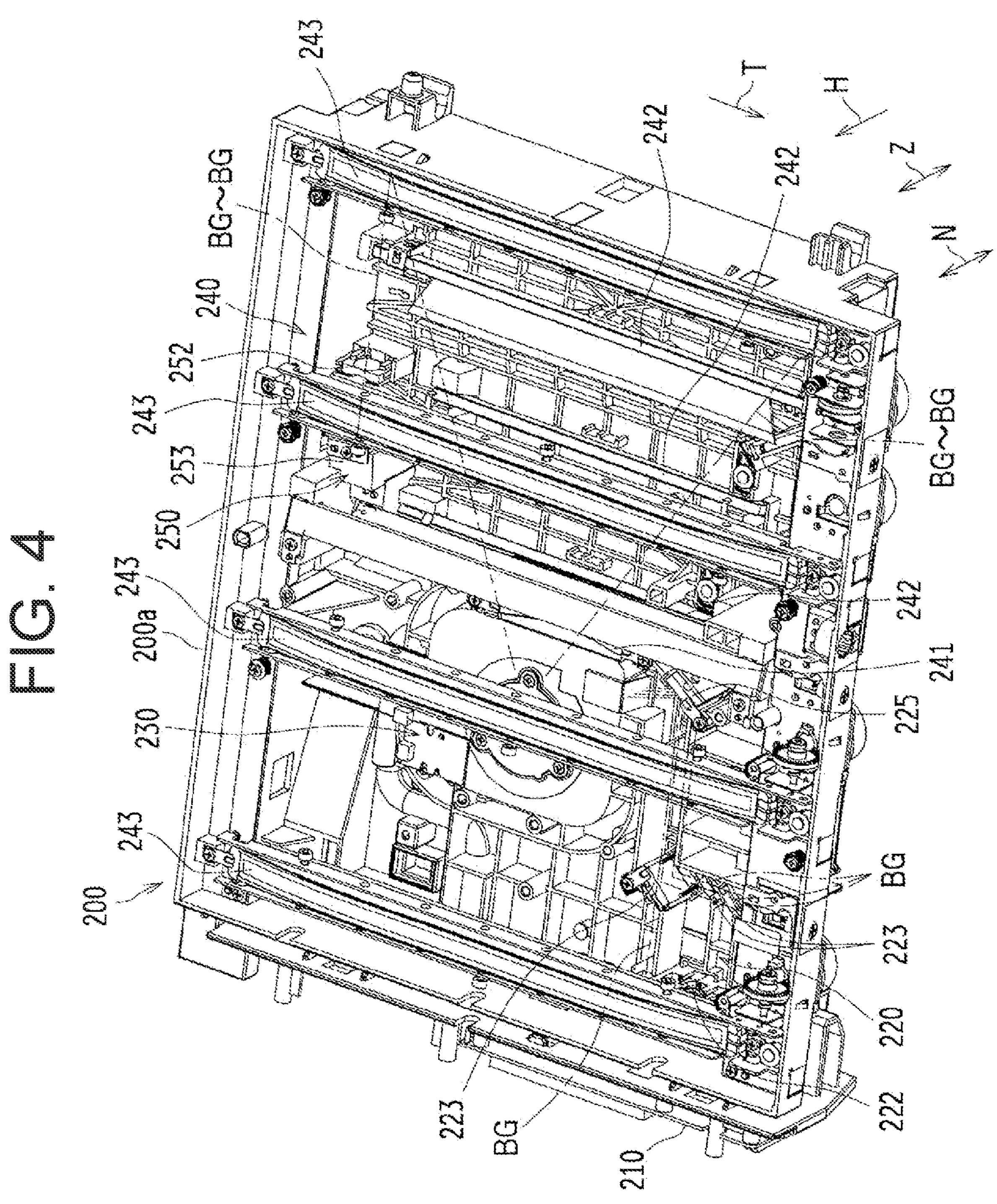
FIG. 4 is a schematic perspective view illustrating an internal structure of the optical scanning device shown in FIG. 1.
Figure 5:
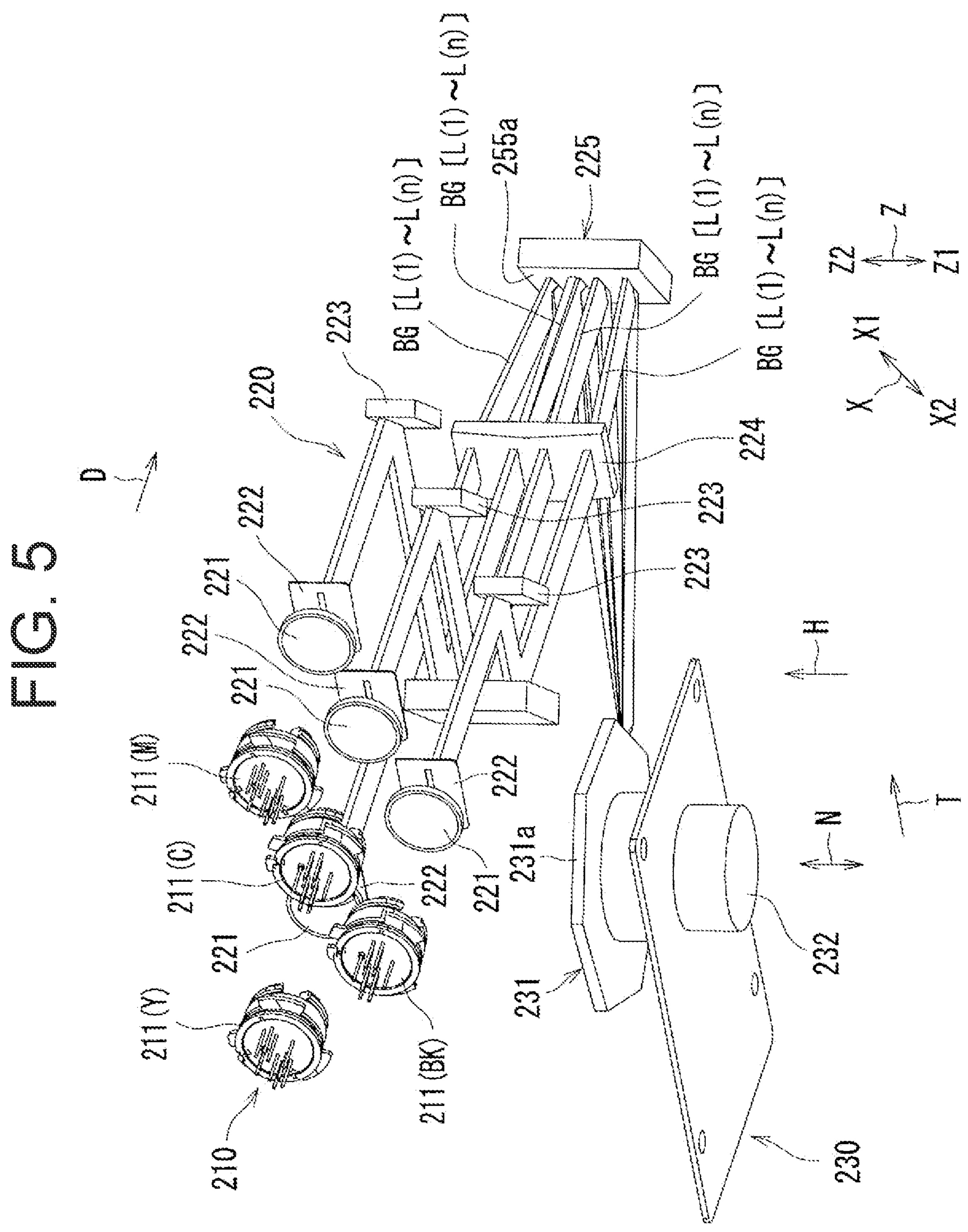
FIG. 5 is a perspective view illustrating an incident optical system in the optical scanning device.
Figure 6A:
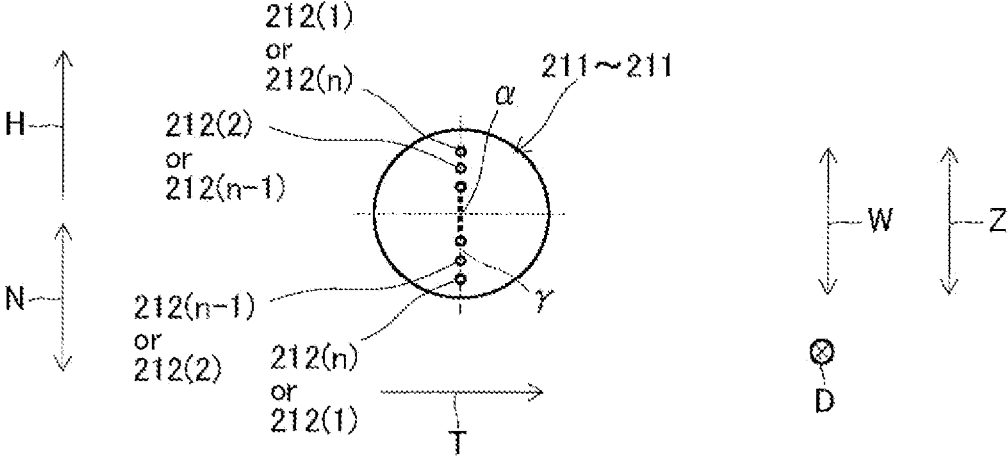
FIG. 6A is a side view schematically illustrating a state in which a plurality of light emitting elements are located at reference adjustment positions as viewed from a side opposite to a light emission side in the multi-beam light source.
Figure 6B:
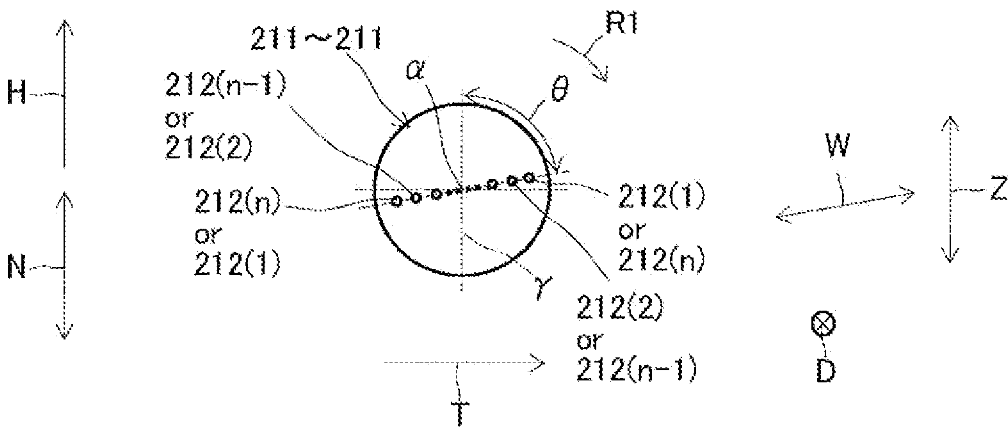
FIG. 6B is a side view schematically illustrating a state in which the multi-beam light source is rotated by a rotational angle in a clockwise direction around a rotational axis from the reference adjustment position shown in FIG. 6A when viewed from the side opposite to the light emission side (rear side of the multi-beam light source).
Figure 6C:
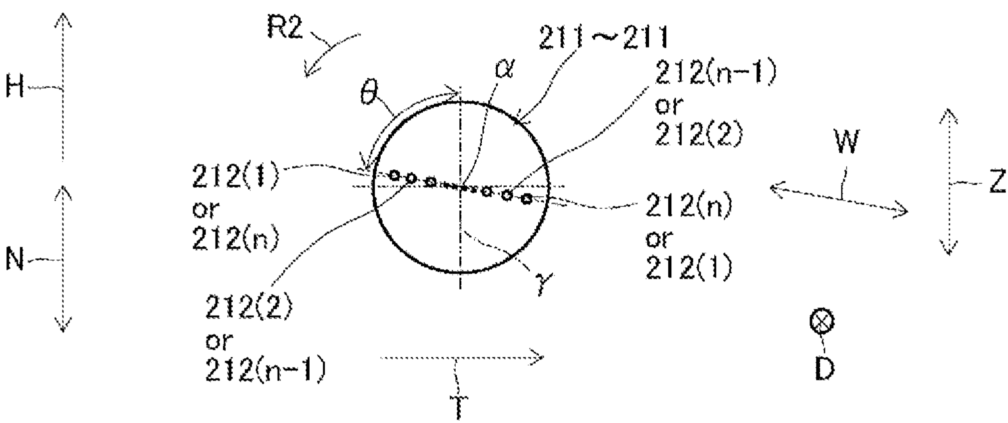
FIG. 6C is a side view schematically illustrating a state in which the multi-beam light source is rotated by a rotational angle in a counterclockwise direction around the rotational axis from the reference adjustment position shown in FIG. 6A when viewed from the side (rear side of the multi-beam light source) opposite to the light emission side.

FIG. 2 is a schematic plan view schematically illustrating a part of an optical system of the optical scanning device 200 shown in FIG. 1. FIG. 3 is a schematic side view illustrating a part of the optical system of the optical scanning device 200 shown in FIG. 1 together with a positional relationship with photosensitive drums 3 to 3. FIG. 4 is a schematic perspective view illustrating an internal structure of the optical scanning device 200 shown in FIG. 1. FIG. 5 is a perspective view illustrating an incident optical system 220 in the optical scanning device 200. FIG. 6A is a side view schematically illustrating a state in which a plurality of light emitting elements 212(1) to 212(*n*) are located at reference adjustment positions as viewed from a side opposite to a light emission side (rear side of the multi-beam light source 211) in the multi-beam light source 211. FIGS. 6B and 6C are side views schematically illustrating a state in which the multi-beam light source 211 is rotated around a rotational axis α in a clockwise direction R1 and in a counterclockwise direction R2 by the rotational angle θ from the reference adjustment position shown in FIG. 6A, respectively, when viewed from the side opposite to the light emission side (rear side of the multi-beam light source 211).

The optical scanning device 200 includes the multi-beam light source 211 having a plurality of the light emitting elements 212(1) to 212(*n*) (n is an integer of 2 or more, n=8 in this example) aligned in parallel in a predetermined linear direction W, a rotary polygon mirror 231 (polygon mirror), and a reflection mirror 225 along a rotary axis direction N of the rotary polygon mirror 231. In this example, the plurality of light emitting elements 212(1) to 212(*n*) are laser diodes.

In detail, the optical scanning device 200 includes a light source 210, the incident optical system 220, a deflecting device 230, an emission optical system 240, and a detector 250.

The light source 210 includes a plurality of the multi-beam light sources 211 to 211. The multi-beam light sources 211 to 211 emit beam groups BG to BG (specifically, laser beam groups), respectively. The incident optical system 220 is disposed between the light source 210 and the deflecting device 230 on the optical path of the beam groups BG to BG. The incident optical system 220 causes the beam groups BG to BG emitted from the light source 210 to enter the deflecting device 230.

The deflecting device 230 deflects and scans the beam groups BG to BG incident from the light source 210 via the incident optical system 220 in a main-scanning direction T. The emission optical system 240 is disposed between the deflecting device 230 and surfaces to be scanned F to F (see FIG. 3) (in this example, the surfaces of the photosensitive drums 3 to 3) on the optical paths of the beam groups BG to BG. The emission optical system 240 emits the beam groups BG to BG emitted from the deflecting device 230 onto the surfaces to be scanned F to F. The detector 250 detects the beam groups BG to BG emitted from the deflecting device 230. The light source 210, the incident optical system 220, the deflecting device 230, the emission optical system 240, and the detector 250 are disposed on a housing 200*a*.

In the optical scanning device 200, the beam groups BG to BG emitted from the light source 210 are made incident to the deflecting device 230 via the incident optical system 220 and are deflected and scanned in the main-scanning direction T by the deflecting device 230, and image information is written on the surfaces to be scanned F to F of the surfaces of the photosensitive drums 3 to 3 via the emission optical system 240 while being detected by the detector 250. It is to be noted that the beam groups BG to BG periodically scan the surfaces to be scanned F to F in the main-scanning direction T, but since the photosensitive drums 3 to 3 rotate in a rotation direction B (see FIG. 3), the beam groups BG to BG can also scan the surfaces to be scanned F to F in the sub-scanning direction H on the photosensitive drums 3 to 3.

Light Source

The light source 210 includes a plurality of (four in this example) multi-beam light sources 211 to 211 corresponding to each of the colors. In this example, the multi-beam light sources 211 to 211 are for Y (yellow), M (magenta), C (cyan), and BK (black), respectively. It is to be noted that the multi-beam light sources 211 to 211 are the same members. Thus, in FIGS. 6A to 6C, one multi-beam light source 211 is shown as a representative.

The multi-beam light sources 211 to 211 emit beam groups BG to BG modulated in accordance with image data, respectively. Each of the multi-beam light sources 211 to 211 includes a plurality of light emitting elements 212(1) to 212(*n*). The light emitting elements 212(1) to 212(*n*) in the multi-beam light source 211 emit light beams L(1) to L(n) (laser beams) each having a circular cross section (beam cross section) perpendicular to an optical axis, respectively. Each of the beam groups BG is composed of the light beams L(1) to L(n).

The multi-beam light source 211 can be rotationally adjusted around the rotational axis α along the emission direction D of the plurality of light beams L(1) to L(n). In detail, the plurality of light emitting elements 212(1) to 212(*n*) are aligned in parallel at a predetermined constant interval (pitch) in the linear direction W. The multi-beam light source 211 can be rotationally adjusted around the rotational axis α along the emission direction D of the plurality of light beams L(1) to L(n) with respect to the housing 200*a*. The rotational axis α is located at an intermediate point in the linear direction W between the light emitting element 212(1) at one end and the light emitting element 212(*n*) at the other end among the plurality of light emitting elements 212(1) to 212(*n*).

Here, as shown in FIGS. 6B and 6C, a factory worker adjusts in advance the rotational angle θ of the multi-beam light source 211 in the clockwise direction R1 or in the counterclockwise direction R2 so that beam spots (not shown) on the surface to be scanned F (image surface) have a one dot pitch (for example, 10.58 μm in the case of resolution of 2400 dpi) in the sub-scanning direction H. For example, in the case of the resolution of 2400 dpi, the rotational angle θ is approximately 80 degrees.

Incident Optical System

Figure 7A:
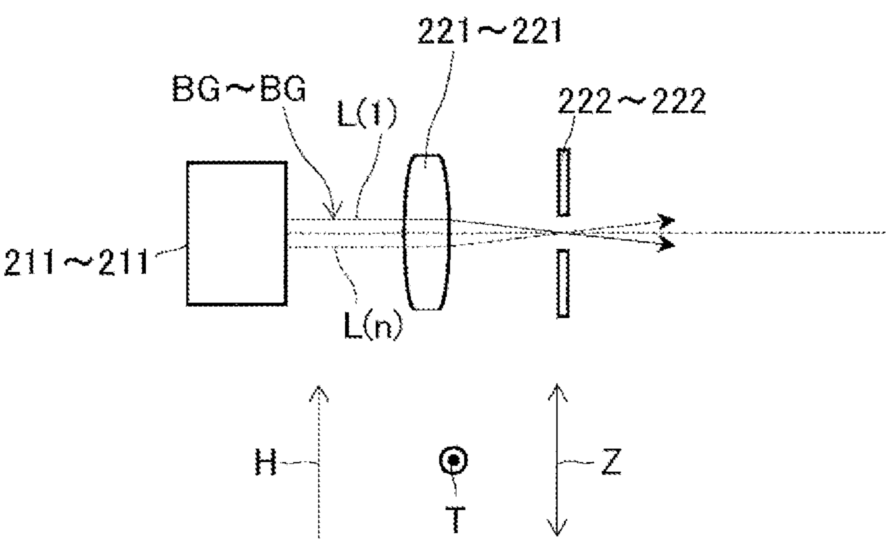
FIG. 7A is a diagram schematically illustrating the multi-beam light source, a collimator lens, and an aperture as viewed from a main-scanning direction.
Figure 7B:
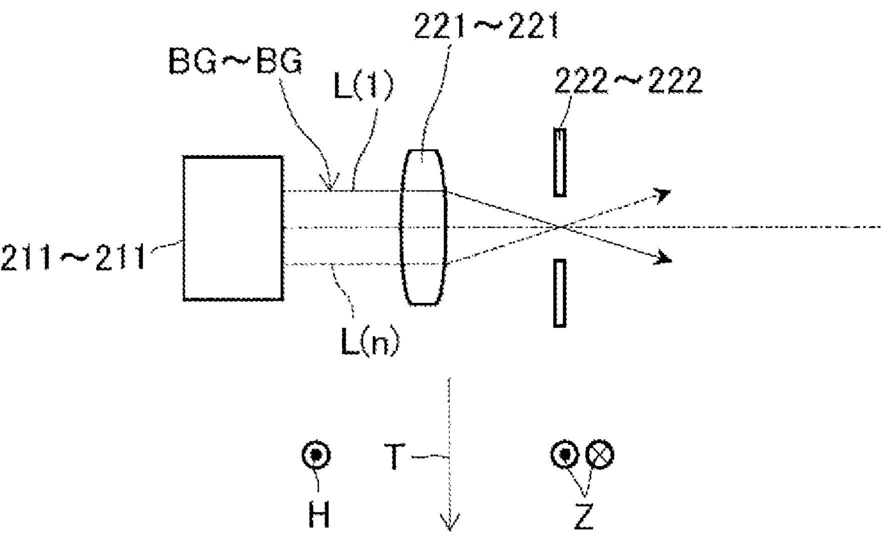
FIG. 7B is a diagram schematically illustrating the multi-beam light source, the collimator lens, and the aperture as viewed from a sub-scanning direction.

FIGS. 7A and 7B are schematic diagrams of the multi-beam light sources 211 to 211, the collimator lenses 221 to 221, and the apertures 222 to 222 viewed from the main-scanning direction T and the sub-scanning direction H, respectively. It is to be noted that the multi-beam light sources 211 to 211, the collimator lenses 221 to 221, and the apertures 222 to 222 are the same members. Thus, in FIGS. 7A and 7B, one multi-beam light source 211, one collimator lens 221, and one aperture 222 are shown as representatives.

Figure 8:
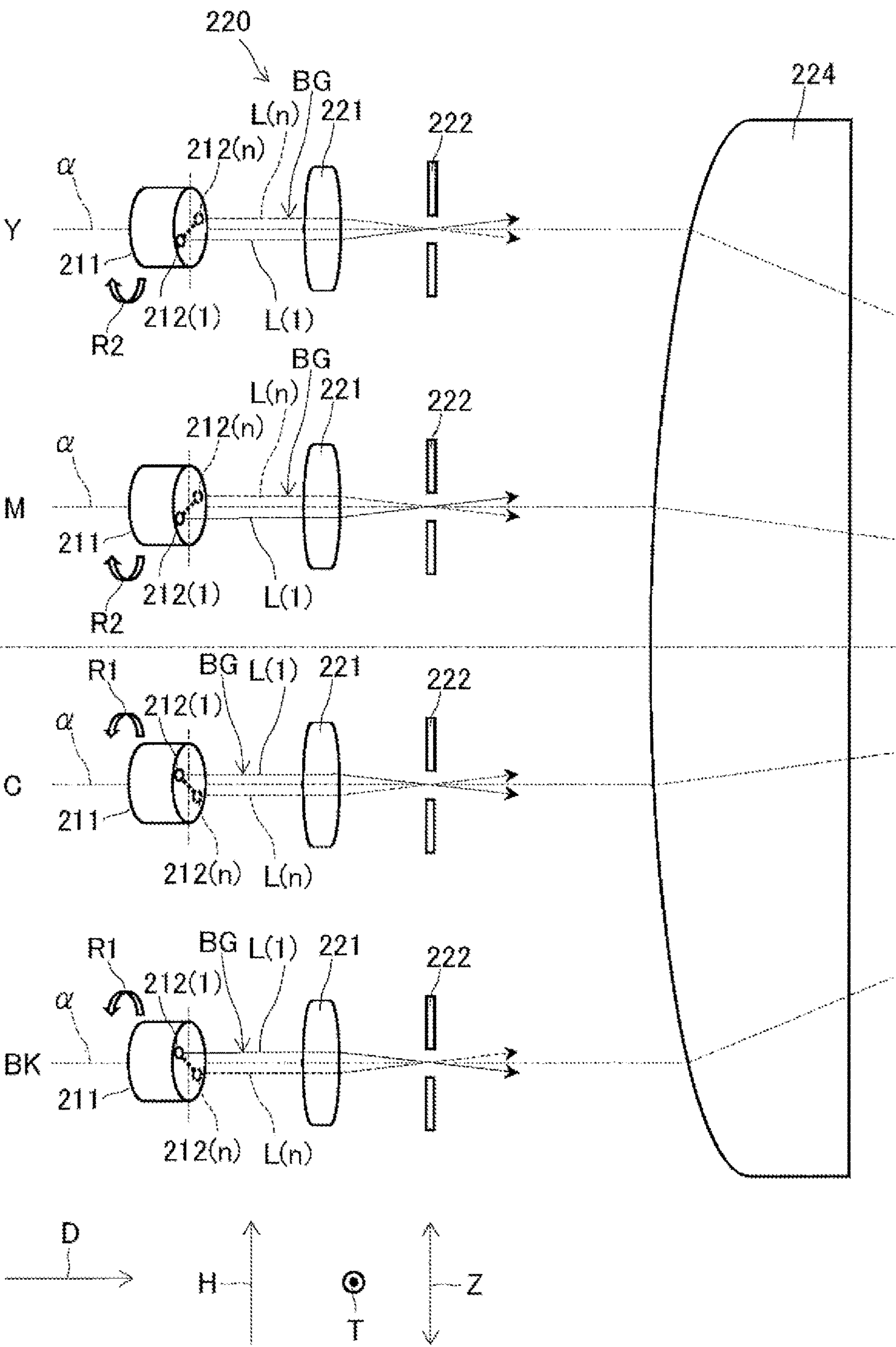
FIG. 8 is a schematic diagram illustrating the multi-beam light source, the collimator lens, the aperture, and a cylindrical lens portion in the incident optical system.
Figure 9:
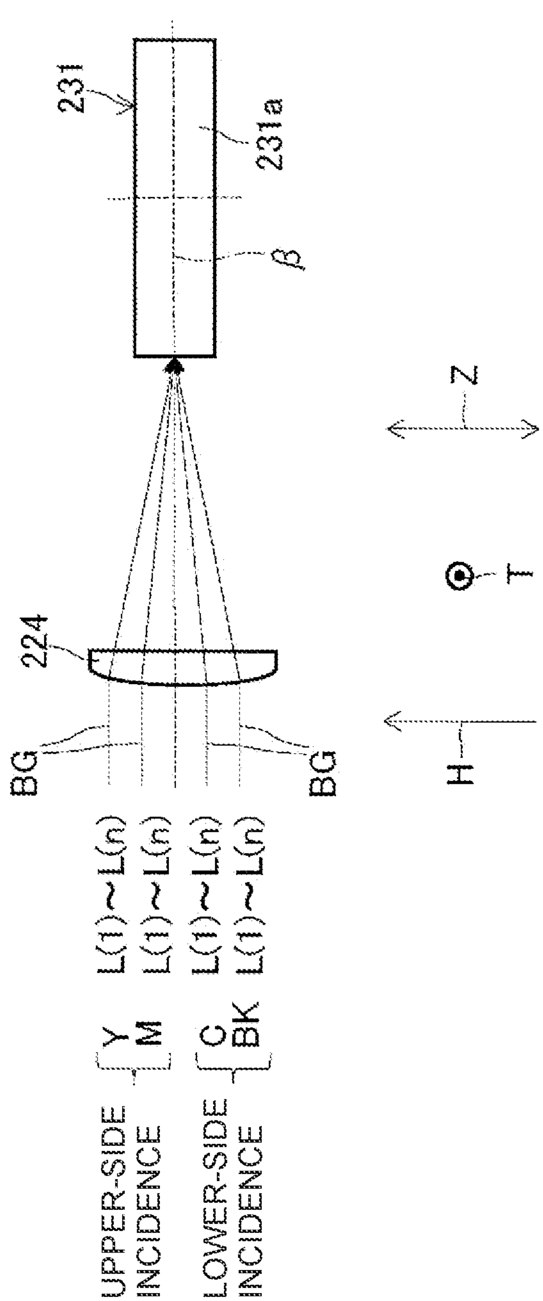
FIG. 9 is a schematic diagram illustrating the cylindrical lens and a rotary polygon mirror portion in the incident optical system.

FIG. 8 is a schematic diagram illustrating the multi-beam light sources 211 to 211, the collimator lenses 221 to 221, the apertures 222 to 222, and a cylindrical lens 224 part in the incident optical system 220. FIG. 9 is a schematic diagram illustrating the cylindrical lens 224 and a rotary polygon mirror 231 part in the incident optical system 220.

The incident optical system 220 (see FIGS. 2, 4, and 5) irradiates a targeted target position β (see FIG. 9) of the reflection surface 231*a* of the rotary polygon mirror 231 with the beam groups BG to BG emitted from the light source 210. The incident optical system 220 includes a plurality of (four in this example) the collimator lenses 221 to 221, a plurality of (four in this example) the apertures 222 to 222, a plurality of (four in this example) the intermediate mirrors 223 to 223, the cylindrical lens 224, and the reflection mirror 225.

As shown in FIGS. 7A and 7B, each of the collimator lenses 221 to 221 refracts the plurality of light beams L(1) to L(n) from the plurality of light emitting elements 212 (1) to 212 (*n*) in a direction of converging in both the main-scanning direction T and the sub-scanning direction H. Focal positions of the collimator lenses 221 to 221 are set to the disposition positions of the apertures 222 to 222.

Each of the apertures 222 to 222 is a plate-state member in which a slit-shaped opening (not shown) elongated in the main-scanning direction T is formed. The apertures 222 to 222 are optical components that shape a beam cross-section into a rectangular shape when the beam groups BG to BG pass therethrough.

In this example, the incident optical system 220 is, as shown in FIG. 5, configured to cause the beam group BG from one aperture 222 of the plurality of apertures 222 to 222 to directly enter the cylindrical lens 224 without passing through the intermediate mirrors 223 to 223. The intermediate mirrors 223 to 223 are optical components that reflect and guide the beam groups BG to BG emitted from the remaining apertures 222 to 222 to the cylindrical lens 224.

As shown in FIG. 5, the cylindrical lens 224 is provided between the collimator lenses 221 to 221 and the reflection mirror 225. As shown in FIG. 9, the cylindrical lens 224 is an optical member that refracts the plurality of light beams L(1) to L(n) so as to form an image on the reflection surface 231*a* of the rotary polygon mirror 231. In detail, the cylindrical lens 224 converges the beam groups BG [L(1) to L(n)] to BG [L(1) to L(n)] emitted from one aperture 222 and the intermediate mirrors 223 to 223 toward the reflection surface 231*a* of the rotary polygon mirror 231 via the reflection mirror 225 (not shown in FIG. 9).

As shown in FIGS. 2 and 5, the reflection mirror 225 is an optical component that reflects and guides the beam groups BG to BG emitted from the cylindrical lens 224 to the target position β (see FIG. 9) on the reflection surface 231*a* of the rotary polygon mirror 231. The reflection mirror 225 is disposed (in this example, stood on a bottom surface of the housing 200*a*) such that the mirror surface 225*a* follows an up-down direction Z and faces both the multi-beam light source 211 and the rotary polygon mirror 231.

Deflecting Device

As shown in FIG. 2, the deflecting device 230 includes the rotary polygon mirror 231 and a drive motor 232 that rotates and drives the rotary polygon mirror 231. The rotary polygon mirror 231 is fixed to a rotary shaft 232*a* of the drive motor 232. The rotary polygon mirror 231 has a plurality of reflection surfaces 231*a* to 231*a* along the rotary shaft 232*a* on the periphery. The drive motor 232 rotates in the constant rotating direction E at a constant rotation speed. As a result, the rotary polygon mirror 231 can deflect and scan the beam groups BG to BG incident to a reflection point R on the reflection surface 231*a* in the-main-scanning direction T.

Reflective Optical System

As shown in FIGS. 2 to 4, the emission optical system 240 reflects and refracts the beam groups BG to BG repeatedly scanned in the main-scanning direction T and emits the beam groups BG to BG onto the surfaces to be scanned F to F. The emission optical system 240 includes a first fθ lens 241, a plurality of folding mirrors 242 to 242, and second fθ lenses 243 to 243. These optical members are formed in a rod shape elongated in the main-scanning direction T, and both ends thereof are supported by support members.

The first fθ lens 241 is an optical member that performs correction such that the beam groups BG to BG emitted from the reflection surface 231*a* of the rotary polygon mirror 231 and moving at a constant angular speed move on the surfaces to be scanned F to F at a constant speed. The folding mirrors 242 to 242 are optical members that reflect the beam groups BG to BG having passed through the first fθ lens 241 and guide the beam groups BG to BG to the second fθ lenses 243 to 243. The second fθ lenses 243 to 243 are optical members that converge the beam groups BG to BG on the surfaces to be scanned F to F.

Detector

As shown in FIGS. 2 and 4, the detector 250 includes a detection mirror 251, a condensing lens 252, and a semiconductor optical sensor 253. The detection mirror 251 is an optical member that reflects the beam groups BG to BG emitted from the reflection surface 231*a* of the rotary polygon mirror 231 and guides the beam groups BG to BG the condensing lens 252. The condensing lens 252 is an optical member that condenses the beam groups BG to BG emitted from the detection mirror 251 onto the semiconductor optical sensor 253. The semiconductor optical sensor 253 (specifically, a photodiode) photoelectrically converts the beam groups BG to BG condensed by the condensing lens 252. In this example, the detector 250 is a beam detect (BD) sensor that controls scanning timing of the beam groups BG to BG (specifically, writing timing of an image onto the surfaces to be scanned F to F).

Present Embodiment

Figure 10A:
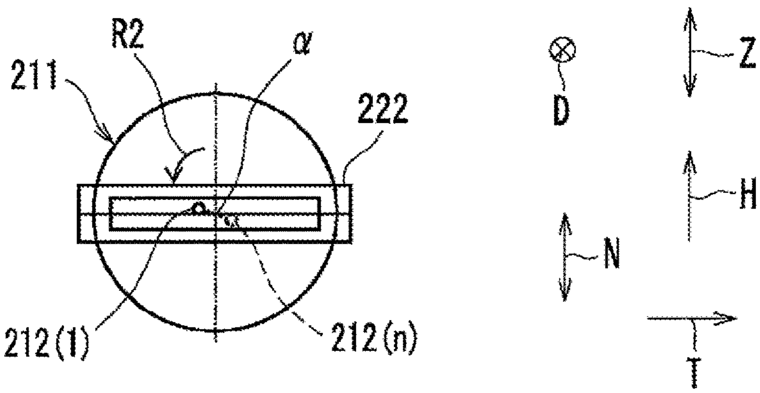
FIG. 10A is a side view schematically illustrating a state in which the multi-beam light source is rotationally adjusted in the counterclockwise direction in the lower-side incidence as viewed from the side opposite to a light emission side (rear side of the multi-beam light source).
Figure 10B:
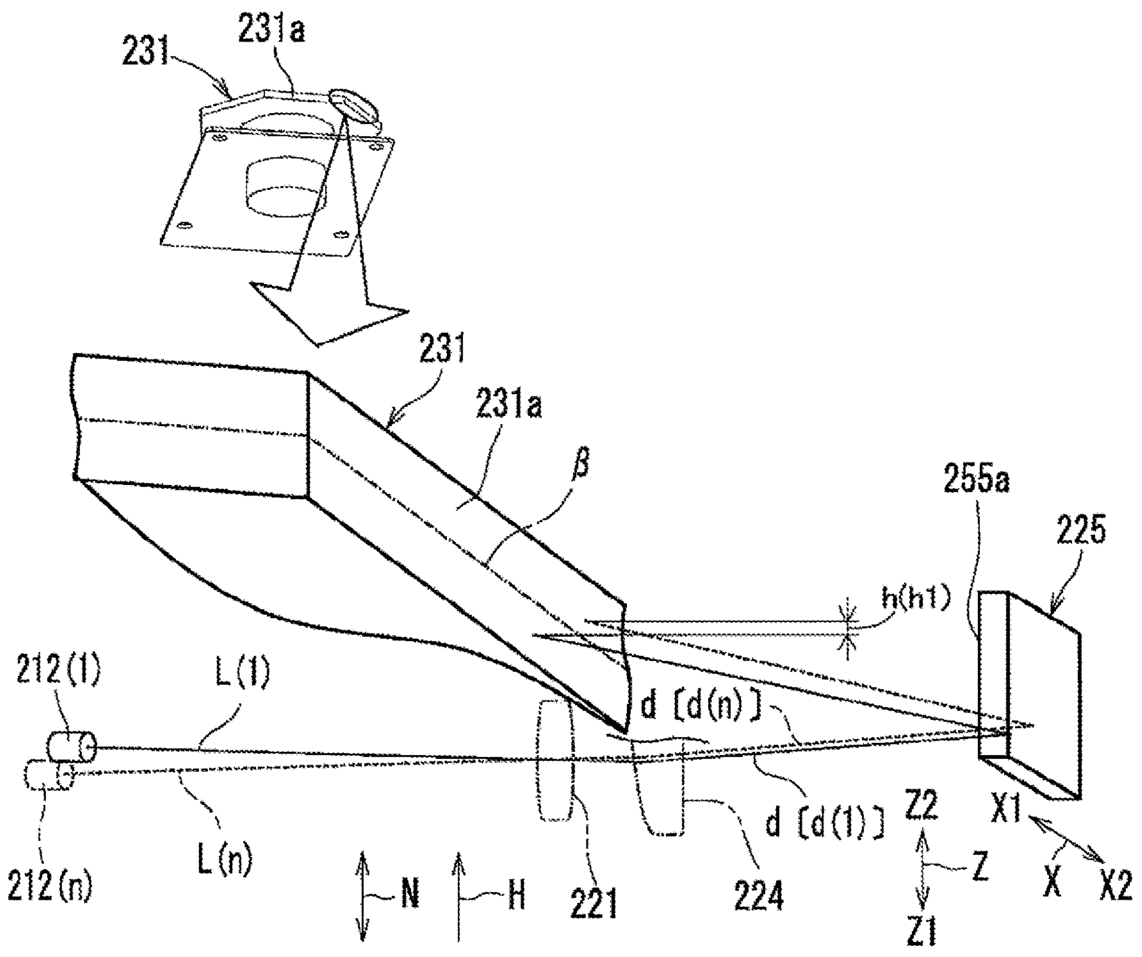
FIG. 10B is a perspective view schematically illustrating a state in which a plurality of the light beams emitted from the light emitting element of the multi-beam light source rotationally adjusted in the counterclockwise direction are made incident to the reflection surface of the rotary polygon mirror in the lower-side incidence.
Figure 11A:
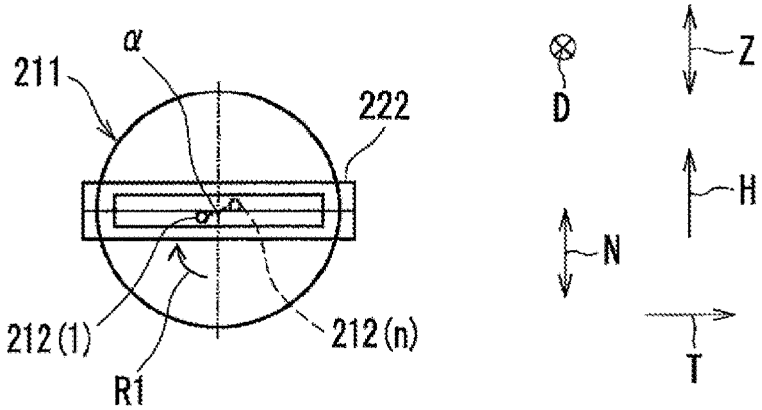
FIG. 11A is a side view schematically illustrating a state in which the multi-beam light source is rotationally adjusted in the clockwise direction in the upper-side incidence as viewed from the side opposite to the light emission side (rear side of the multi-beam light source).
Figure 11B:
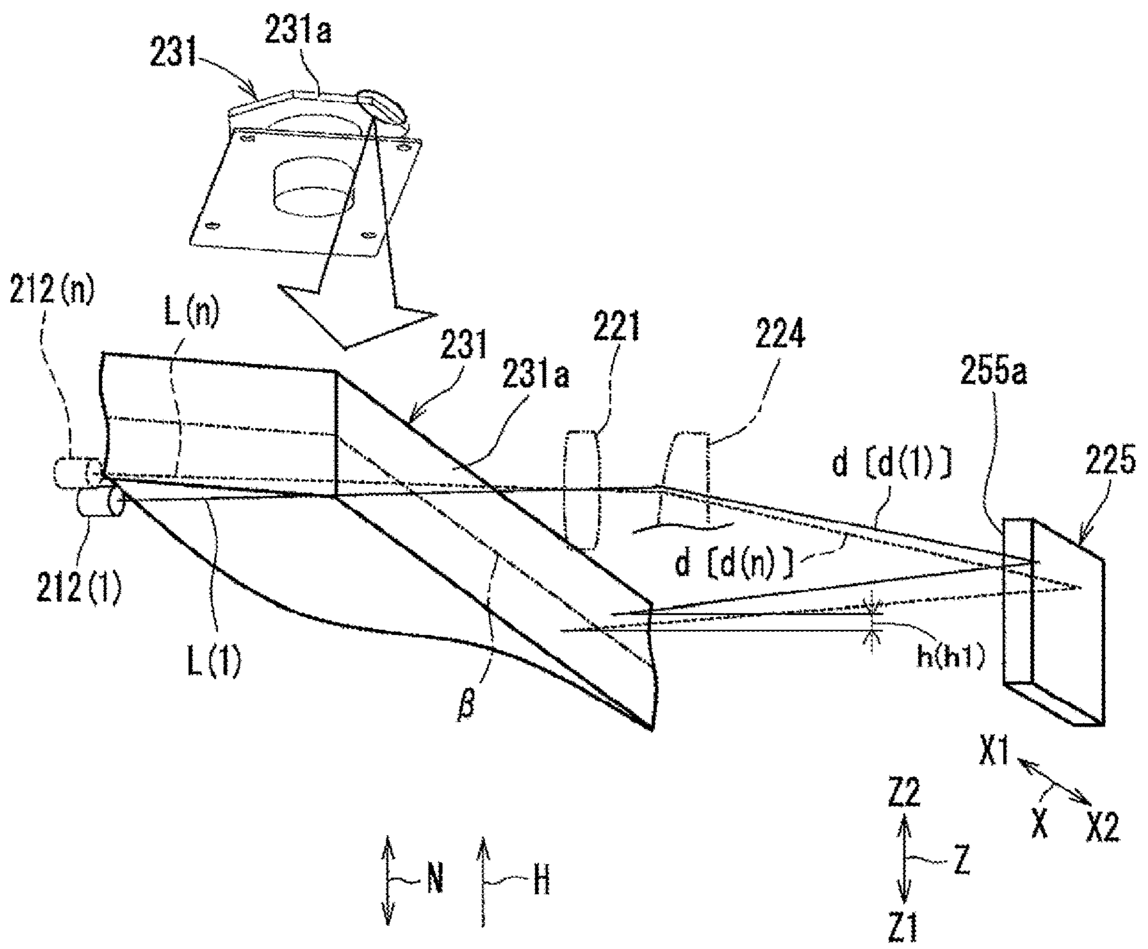
FIG. 11B is a perspective view schematically illustrating a state in which a plurality of light beams emitted from the light emitting elements of the multi-beam light source rotationally adjusted in the clockwise direction are made incident to the reflection surface of the rotary polygon mirror in the upper-side incidence.

FIGS. 10A and 11A are side views schematically illustrating a state in which the multi-beam light source 211 as viewed from the side opposite to the light emission side (rear side of the multi-beam light source 211) is rotationally adjusted in the counterclockwise direction R2 and in the clockwise direction R1 in the lower-side incidence and the upper-side incidence. FIGS. 10B and 11B are perspective views schematically illustrating a state in which a plurality of the light beams L(1) to L(n) emitted from the light emitting elements 212(1) to 212(*n*) of the multi-beam light source 211 rotationally adjusted in the counterclockwise direction R2 and the in clockwise direction R1 are made incident to the reflection surface 231*a* of the rotary polygon mirror 231 in the lower-side incidence and the upper-side incidence, respectively.

Meanwhile, in the optical scanning device 200, there are cases of one-side incidence (lower-side incidence) in which the plurality of light beams L(1) to L(n) are made incident to the rotary polygon mirror 231 from either one of sides in the rotary axis direction N of the rotary polygon mirror 231 (lower side when the rotary axis direction N of the rotary polygon mirror 231 is regarded as the up-down direction Z) and the other-side incidence (upper-side incidence) in which the light beams are made incident to the rotary polygon mirror 231 from the other side in the rotary axis direction N of the rotary polygon mirror 231 (upper side when the rotary axis direction N of the rotary polygon mirror 231 is regarded as the up-down direction Z). In this case, depending on the rotational direction (R1, R2) around the rotational axis α when the multi-beam light sources 211 to 211 are rotationally adjusted, a difference in an optical path length [|d(1)−d(N)] between predetermined reference optical path positions of the light beams L(1) to L(n) from the plurality of light emitting elements 212(1) to 212(*n*) (a position of the cylindrical lens 224 in this example) and the mirror surface 225*a* of the reflection mirror 225 increases between the light emitting elements 212(1), 212(*n*) at both end parts and then, a deviation amount from a targeted target position β (a center part in the rotary axis direction N) of the reflection surface 231*a* of the rotary polygon mirror 231, that is, a sub-scanning width h in the sub-scanning direction H of the plurality of light beams L(1) to L(n) (the entire width h in the sub-scanning direction H of the plurality of light beams L(1) to L(n)) becomes large, which incurs deterioration of a resolution in some cases. The higher a high resolution becomes (to 2400 dpi or more, for example), that is, the smaller a dot diameter becomes (to 10.6 μm or less, for example), the more conspicuous it becomes. Here, the reference optical path position is an optical path position where there is no optical member such as a mirror on an upstream side of the reflection mirror 225 in the emission direction D, that is, an optical path position where the plurality of light beams L(1) to L(n) are made incident directly to the reflection mirror 225.

With reference to FIGS. 10A to 11B, disadvantages in the case of incidence from one side (lower-side incidence) and in the case of incidence from the other side (upper-side incidence) will be described below. It is to be noted that the case of the other side incidence (upper-side incidence) and the case of the one side incidence (lower-side incidence) are line-symmetric (vertically line-symmetric) along the main-scanning direction T in the rotary axis direction N.

As shown in FIGS. 10B and 11B, the multi-beam light source 211 is adjusted in some cases such that the light beam L(n) incident to the reflection mirror 225 from the light emitting element 212(*n*) on a longer side of the optical path length d(n) from the reference optical path position (position of the cylindrical lens 224) to the mirror surface 225*a* of the reflection mirror 225 among the plurality of light emitting elements 212(1) to 212(*n*) becomes either one of the other side (upper side) (see FIG. 10B) and one side (lower side) (see FIG. 11B) in the rotary axis direction N rather than the light beam L(1) incident to the reflection mirror 225 from the light emitting element 212(1) on a shorter side of the optical path length d(1) from the reference optical path position (position of the cylindrical lens 224) to the mirror surface 225*a* of the reflection mirror 225. In this example, the multi-beam light source 211 is adjusted so as to rotate in the counterclockwise direction R2 (see FIG. 10A) and in the clockwise direction R1 (see FIG. 11A) in some cases. Then, the following inconvenience occurs.

That is, as shown in FIGS. 10B and 11B, the difference [|d(1)−d(n)] between the light emitting elements 212(1), 212(*n*) at both end parts of the optical path length between the reference optical path positions of the light beams L(1) to L(n) from the plurality of light emitting elements 212(1) to 212(*n*) (the position of the cylindrical lens 224) and the mirror surface 225*a* of the reflection mirror 225 increases and then, a deviation amount from a targeted target position β of the reflection surface 231*a* of the rotary polygon mirror 231, that is, the sub-scanning width h(h1) in the sub-scanning direction H of the plurality of light beams L(1) to L(n) becomes large, which incurs deterioration of the resolution in some cases.

More specifically, the light beam L(1) of the light emitting element 212(1) on the shorter side (inner side in the main-scanning direction T) of the optical path length d[d(1)] is refracted outward and diagonally upward (see FIG. 10B) and diagonally downward (see FIG. 11B) toward the reflection mirror 225 by the collimator lens 221 and the cylindrical lens 224, and is reflected further diagonally upward (see FIG. 10B) and diagonally downward (see FIG. 11B) by the mirror surface 225*a* of the reflection mirror 225.

On the other hand, the light beam L(n) of the light emitting element 212(*n*) on the longer side of the optical path length d[d(n)] (outer side in the main-scanning direction T) is refracted inward and diagonally upward (see FIG. 10B) and diagonally downward (see FIG. 11B) toward the reflection mirror 225 by the collimator lens 221 and the cylindrical lens 224, and is reflected further diagonally upward (see FIG. 10B) and further diagonally downward (see FIG. 11B) by the mirror surface 225*a* of the reflection mirror 225.

Then, both the positions at which the light beams L(1), L(n) reflected by the mirror surface 225*a* of the reflection mirror 225 are incident to the reflection surface 231*a* of the rotary polygon mirror 231 are easily separated from the target position ß in the rotary axis direction N. That is, the sub-scanning widths h(h1) in the sub-scanning direction H of the plurality of light beams L(1) to L(n) are likely to become larger.

First Embodiment

Figure 12A:
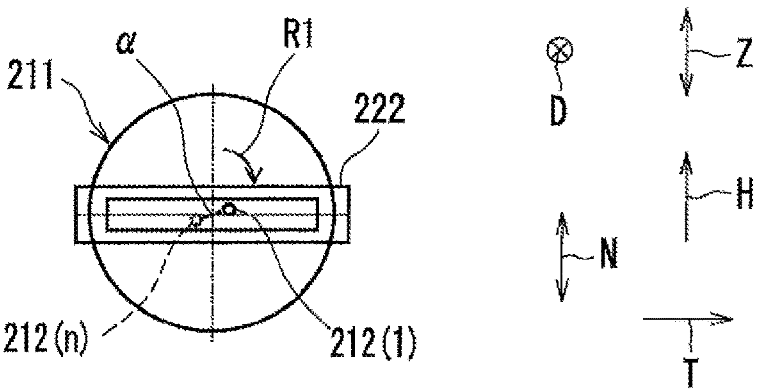
FIG. 12A is a side view schematically illustrating a state in which the multi-beam light source is rotationally adjusted in the clockwise direction in the lower-side incidence as viewed from the side opposite to the light emission side (rear side of the multi-beam light source).
Figure 12B:
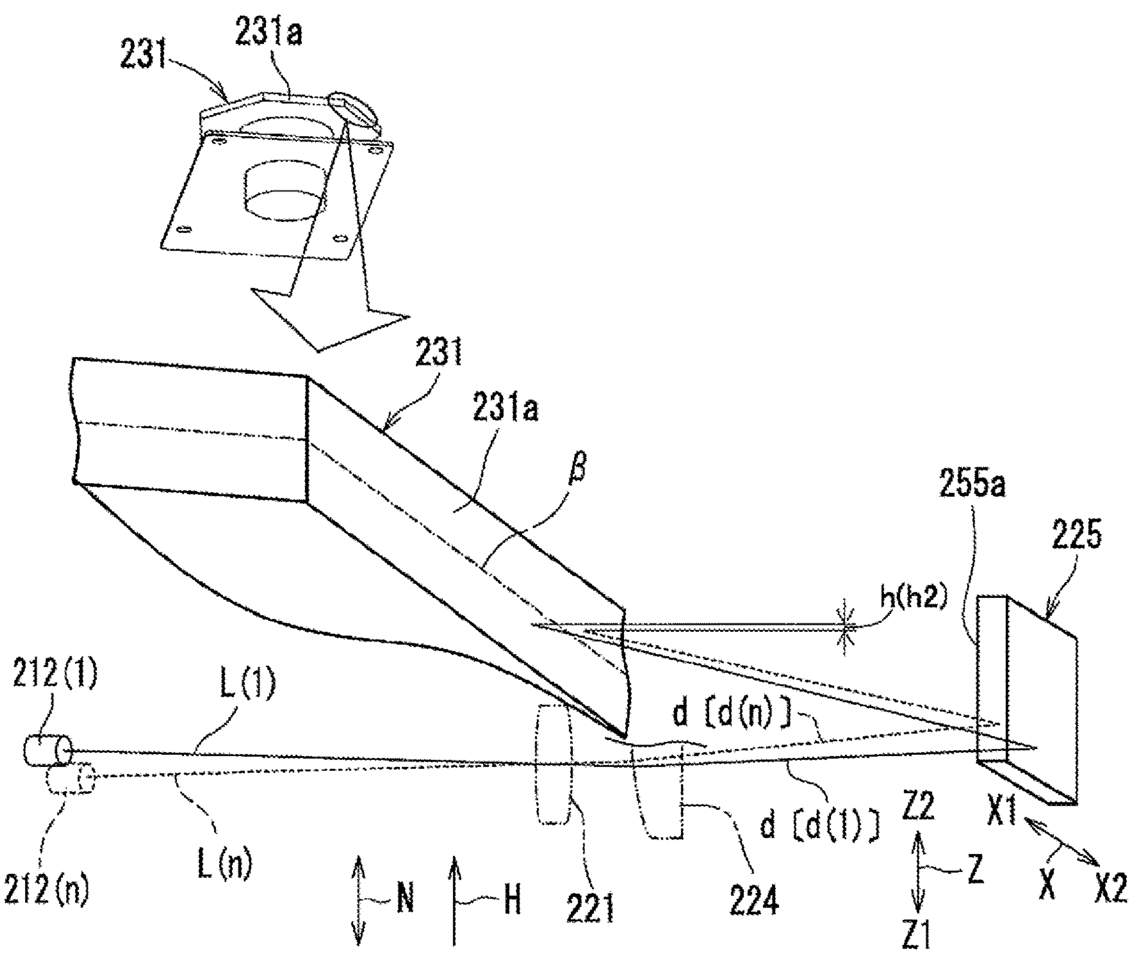
FIG. 12B is a perspective view schematically illustrating a state in which a plurality of the light beams emitted from the light emitting element of the multi-beam light source rotationally adjusted in the clockwise direction are made incident to the reflection surface of the rotary polygon mirror in the lower-side incidence.
Figure 13A:
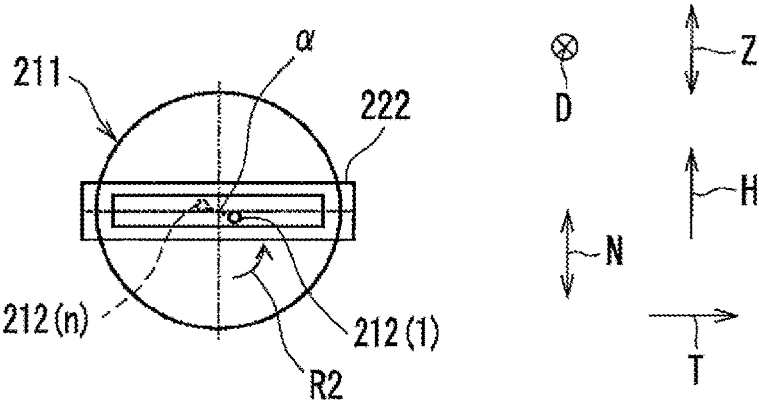
FIG. 13A is a side view schematically illustrating a state in which the multi-beam light source is rotationally adjusted in the counterclockwise direction in the upper-side incidence as viewed from the side opposite to the light emission side (rear side of the multi-beam light source).
Figure 13B:
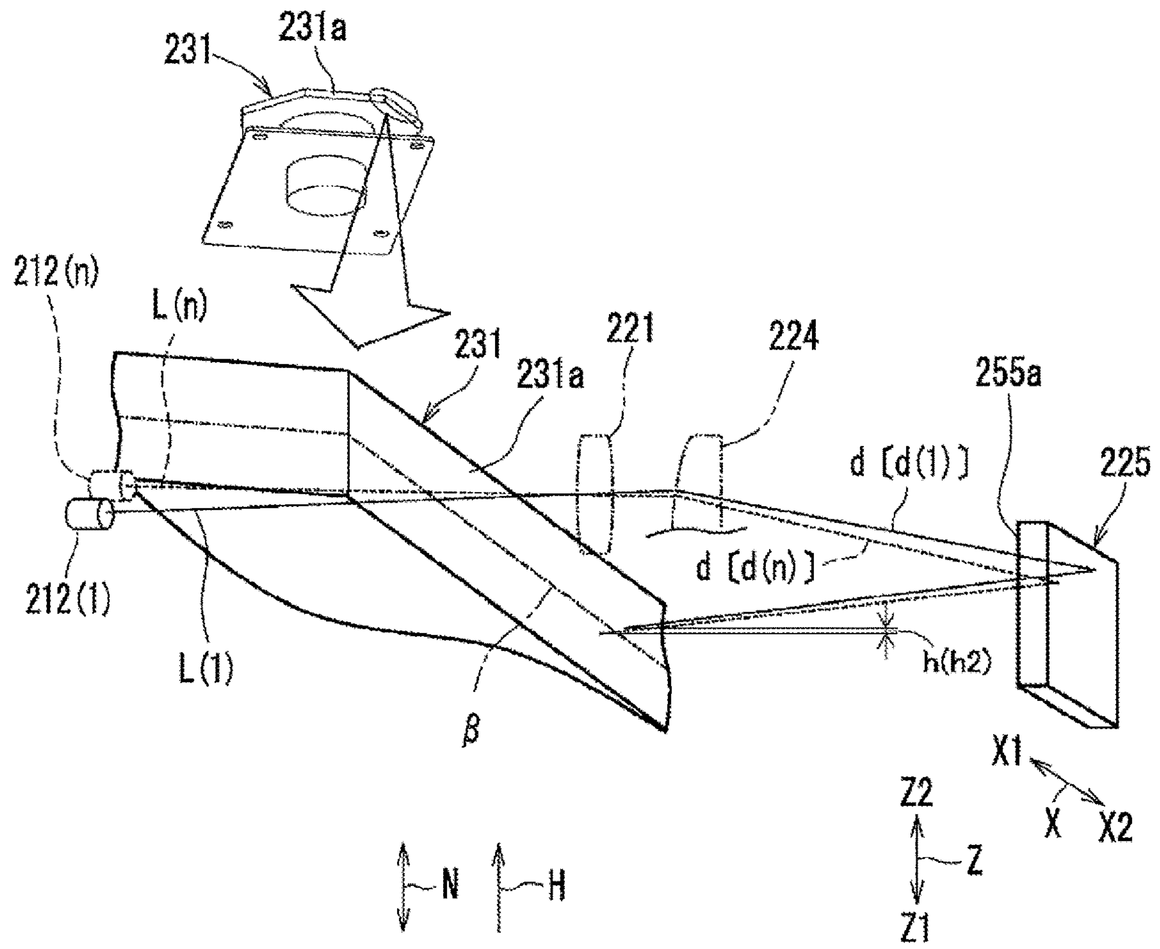
FIG. 13B is a perspective view schematically illustrating a state in which a plurality of the light beams emitted from the light emitting element of the multi-beam light source rotationally adjusted in the counterclockwise direction are made incident to the reflection surface of the rotary polygon mirror in the upper-side incidence.

FIGS. 12A and 13A are side views schematically illustrating a state in which the multi-beam light source 211 as viewed from the side opposite to the light emission side (rear side of the multi-beam light source 211) is rotationally adjusted in the clockwise direction R1 and in the counterclockwise direction R2 in the lower-side incidence and the upper-side incidence, respectively. FIGS. 12B and 13B are perspective views schematically illustrating a state in which a plurality of the light beams L(1) to L(n) emitted from the light emitting elements 212(1) to 212(*n*) of the multi-beam light source 211 rotationally adjusted in the clockwise direction R1 and the counterclockwise direction R2 are made incident to the reflection surface 231*a* of the rotary polygon mirror 231 in the lower-side incidence and the upper-side incidence, respectively.

In this point, the optical scanning device 200 according to this Embodiment is supposed to have the following configuration. It is to be noted that the case of the other side incidence (upper-side incidence) and the case of the one side incidence (lower-side incidence) are line-symmetric (vertically line-symmetric) along the main-scanning direction T in the rotary axis direction N.

As shown in FIGS. 12B and 13B, the multi-beam light source 211 is rotationally adjusted such that the light beam L(1) incident to the reflection mirror 225 from the light emitting element 212(1) on a longer of the optical path length d[d(1)] from a predetermined reference optical path position (position of the cylindrical lens 224 in this example) on the upstream side of the reflection mirror 225 among the plurality of light emitting elements 212(1) to 212(*n*) to the mirror surface 225*a* of the reflection mirror 225 becomes either one of sides (lower side) (see FIG. 12B) and the other side (upper side) (see FIG. 13B) in the rotary axis direction N rather than the light beam L(n) incident to the reflection mirror 225 from the light emitting element 212(*n*) on a shorter side of the optical path length d[d(n)] from the reference optical path position (position of the cylindrical lens 224) to the mirror surface 225*a* of the reflection mirror 225. In this example, the multi-beam light source 211 is adjusted so as to rotate in the clockwise direction R1 (see FIG. 12A) and in the counterclockwise direction R2 (see FIG. 13A).

More specifically, the light beam L(1) of the light emitting element 212(1) on the longer side (outer side) of the optical path length d[d(1)] is refracted inward and diagonally upward (see FIG. 12B) and diagonally downward (see FIG. 13B) toward the reflection mirror 225 by the collimator lens 221 and the cylindrical lens 224, and is reflected further diagonally upward (see FIG. 12B) and further diagonally downward (see FIG. 13B) by the mirror surface 225*a* of the reflection mirror 225. At this time, the light beam L(1) is to be incident to the upper side and the lower side of the mirror surface 225*a* for the longer part of the optical path length d[d(1)], but since the light emitting element 212(1) is located on the upper side (see FIGS. 12A and 12B) and the lower side (see FIGS. 13A and 13B) of the light emitting element 212(*n*) on the opposite side (inner side) in the main-scanning direction T in the multi-beam light source 211, the incidence to the upper side and the lower side on the mirror surface 225*a* can be offset for the part directed to the lower side (see FIG. 12B) and the upper side (see FIG. 13B) of the light beam L(n) with respect to the mirror surface 225*a* by the collimator lens 221. As a result, an incident position of the light beam L(1) to the reflection surface 231*a* of the rotary polygon mirror 231 can be made closer to the target position β side than in the examples shown in FIG. 10B and FIG. 11B.

On the other hand, the light beam L(n) of the light emitting element 212(*n*) on the shorter side (inner side) of the optical path length d[d(n)] is refracted outward and diagonally upward (see FIG. 12B) and diagonally downward (see FIG. 13B) toward the reflection mirror 225 by the collimator lens 221 and the cylindrical lens 224, and is reflected further diagonally upward (see FIG. 12B) and further diagonally downward (see FIG. 13B) by the mirror surface 225*a* of the reflection mirror 225. At this time, the light emitting element 212(*n*) is on the lower side (see FIG. 12A, FIG. 12B) and the upper side (see FIG. 13A, FIG. 13B) of the light emitting element 212(1) on the opposite side (outer side) in the main-scanning direction T in the multi-beam light source 211, and the light beam L(n) is to go toward the upper side and the lower side of the light beam L(1) on the mirror surface 225*a* by the collimator lens 221, but the incidence to the upper side and the lower side in the mirror surface 225*a* can be suppressed for the shorter part of the optical path length d[d(n)] of the light emitting element 212(*n*). As a result, an incident position of the light beam L(n) to the reflection surface 231*a* of the rotary polygon mirror 231 can be made closer to the target position β side than in the examples shown in FIGS. 10B and 11B.

Therefore, with respect to the light beams L(1), L(n) reflected by the mirror surface 225*a* of the reflection mirror 225, the positions where the light beams L(1), L(n) are incident to the reflection surface 231*a* of the rotary polygon mirror 231 can be easily approached from the target position β in the rotary axis direction N. That is, the sub-scanning width h(h2) of the plurality of light beams L(1) to L(n) in the sub-scanning direction H can be reduced.

As described above, according to this Embodiment, the rotational direction of the multi-beam light source 211 around the rotational axis α is made different to the side where the sub-scanning width h in the sub-scanning direction H of the plurality of light beams L(1) to L(n) is made smaller between the case of the one-side incidence (lower-side incidence case) in which the plurality of light beams L(1) to L(n) are made incident to the rotary polygon mirror 231 from either one of the sides (lower side) in the rotary axis direction N of the rotary polygon mirror 231 and the case of the other side incidence (upper-side incidence case) in which the plurality of light beams L(1) to L(n) are made incident to the rotary polygon mirror 231 from the other side (upper side) in the rotary axis direction N of the rotary polygon mirror 231.

In this way, the difference [|d(1)−d(n)] between the light emitting elements 212(1), 212(*n*) at both end parts of the optical path length between the reference optical path positions (position of the cylindrical lens 224) of the light beams L(1) to L(n) from the plurality of light emitting elements 212(1) to 212(*n*) and the mirror surface 225*a* of the reflection mirror 225 can be made smaller and thus, a deviation amount from the targeted target position β of the reflection surface 231*a* of the rotary polygon mirror 231, that is, the sub-scanning length h(h2) in the sub-scanning direction H of the plurality of light beams L(1) to L(n) can be made smaller [h(h2)<h(h1)].

In this example, the optical scanning device 200 is applied to a color image forming apparatus, and the individual multi-beam light sources 211 are caused to correspond to the light sources in the respective colors, but the optical scanning device 200 may be applied to a monochrome image forming apparatus, and the individual multi-beam light sources 211 may be caused to scan in the main-scanning direction T.

In this Embodiment, as shown in FIGS. 8 and 9, one or a plurality of (two in this example) multi-beam light sources 211 to 211 are provided on either one of sides in the rotary axis direction N and one or a plurality of (two in this example) multi-beam light sources are provided on the other side in the rotary axis direction N with the rotary polygon mirror 231 therebetween.

In this way, preferable application can be realized to the image forming apparatus 100 using a plurality of multi-beam light sources 211 to 211, particularly to a color image forming apparatus.

Second Embodiment

In this Embodiment, as shown in FIGS. 2 and 5, the optical scanning device 200 includes collimator lenses 221 to 221. The collimator lenses 221 to 221 are provided between the multi-beam light sources 211 to 211 and the reflection mirror 225.

In the optical scanning device 200, assuming that the rotary axis direction N of the rotary polygon mirror 231 is the up-down direction Z, as shown in FIGS. 5 and 8 (C, BK), when viewed from the mirror surface 225*a* side of the reflection mirror 225, the plurality of light beams L(1) to L(n) are incident from lower right [a right side X1 in a left-right direction X (see FIG. 5, FIG. 12B) and a lower side Z1 in the up-down direction Z (see FIG. 5, FIG. 12B)] and is reflected from the mirror surface 225*a* of the reflection mirror 225 toward upper left [a left side X2 in the left-right direction X (see FIG. 5, FIG. 12B) and an upper side Z2 in the up-down direction Z (see FIG. 5, FIG. 12B)] (in the case of the lower-side incidence), in the multi-beam light source 211, as shown in FIG. 6A, when viewed from a side opposite to the emission direction D (rear side of the multi-beam light source 211), the plurality of light emitting elements 212(1) to 212(*n*) aligned in parallel in the linear direction W are adjusted to positions rotated by less than 90 degrees (approximately 80 degrees in this example) in the clockwise direction R1 (see FIG. 6B) around the rotational axis α from a predetermined reference adjustment position γ along the up-down direction Z.

In this way, in the lower-side incidence, the sub-scanning widths h in the sub-scanning direction H of the plurality of light beams L(1) to L(n) can be easily made smaller by a simple adjustment operation of rotating the multi-beam light source 211 in the clockwise direction R1, whereby deterioration of resolution can be suppressed.

Third Embodiment

Moreover, in the optical scanning device 200, assuming that the rotary axis direction N of the rotary polygon mirror 231 is the up-down direction Z, as shown in FIGS. 5 and 8 (Y, M), when viewed from the mirror surface 225*a* side of the reflection mirror 225, the plurality of light beams L(1) to L(n) are incident from upper right [the right side X1 in the left-right direction X (see FIG. 5, FIG. 13B) and the upper side Z2 in the up-down direction Z (see FIG. 5, FIG. 13B)] and is reflected from the mirror surface 225*a* of the reflection mirror 225 toward lower left [the left side X2 in the left-right direction X (see FIG. 5, FIG. 13B) and the lower side Z1 in the up-down direction Z (see FIG. 5, FIG. 13B) (in the case of the upper-side incidence), in the multi-beam light source 211, as shown in FIG. 6A, when viewed from the side opposite to the emission direction D (rear side of the multi-beam light source 211), the plurality of light emitting elements 212(1) to 212(*n*) aligned in parallel in the linear direction W are adjusted to positions rotated by less than 90 degrees (approximately 80 degrees in this example) in the counterclockwise direction R2 (see FIG. 6C) around the rotational axis α from the predetermined reference adjustment position γ along the up-down direction Z.

In this way, in the upper-side incidence, the sub-scanning widths h of the plurality of light beams L(1) to L(n) in the sub-scanning direction H can be easily reduced by a simple adjustment operation of rotating the multi-beam light source 211 in the counterclockwise direction R2, whereby deterioration of resolution can be suppressed.

Fourth Embodiment

Meanwhile, it is known that, in the plurality of multi-beam light sources 211 to 211, when a scanning pitch of the plurality of beam groups BG to BG is widened, deterioration in an image quality, such as pitch unevenness in the sub-scanning direction H, is likely to occur on the surfaces to be scanned F to F of the objects to be scanned (in this example, the surfaces of the photosensitive drums 3 to 3). In order to reduce the pitch unevenness in the sub-scanning direction H, it is preferable that the incident angles of the beam groups BG to BG with respect to the rotary polygon mirror 231 is decreased in order to reduce variation in reflection height positions at which the beam groups BG to BG are reflected on the reflection surface 231*a* of the rotary polygon mirror 231.

FIG. 14 is a diagram schematically illustrating another example of an optical path of each of the beam groups BG to BG in the optical scanning device 200 shown in FIG. 1.

In this point, in this Embodiment, an optical path pattern PT formed by combining the optical paths of the beam groups BG to BG incident to the reflection surface 231*a* of the rotary polygon mirror 231 is asymmetric with respect to a reference virtual line φ passing through the reflection surface 231*a* and orthogonal to the rotary axis direction N of the rotary polygon mirror 231 when viewed from a normal direction K of the reflection surface 231*a* of the rotary polygon mirror 231.

In this way, the incident angles of the beam groups BG to BG with respect to the rotary polygon mirror 231 can be decreased. Then, the variation in the reflection height positions at which the beam groups BG to BG are reflected on the reflection surface 231*a* of the rotary polygon mirror 231 can be reduced and thus, the pitch unevenness in the sub-scanning direction H can be reduced. Therefore, in the multi-beam light source 211, the widening of the scanning pitch of the plurality of beam groups BG to BG can be suppressed and thus, deterioration in the image quality, such as pitch unevenness in the sub-scanning direction H on the surfaces to be scanned F to F of the objects to be scanned (in this example, the surfaces of the photosensitive drums 3 to 3) can be made difficult to occur.

Specifically, the two beam groups BG (Y) and BG (BK) on the outer side are made incident to the reflection surface 231*a* of the rotary polygon mirror 231 at the same incident angle λ1 with respect to the reference virtual line φ, and the beam groups BG (M) and BG (C) on the inner side are made incident to the reflection surface 231*a* of the rotary polygon mirror 231 at different incident angles λ2 and λ3 with respect to the reference virtual line q. Therefore, as shown in FIG. 14, the optical path pattern PT formed by combining the optical paths of the beam groups BG (BK), BG (C), BG (M), and BG (Y) incident to the reflection surface 231*a* of the rotary polygon mirror 231 is asymmetric with respect to the reference virtual line φ, when viewed from the normal direction K of the reflection surface 231*a* of the rotary polygon mirror 231.

Fifth Embodiment

Meanwhile, as in this Embodiment, in the case where a configuration in which the plurality of beam groups BG to BG are made incident to the reflection surface 231*a* from a diagonal direction with respect to the sub-scanning direction H is used in order to share the rotary polygon mirror 231 and the first fθ lens 241 and to reduce the size of the optical scanning device 200, in particular, when an optical axis difference of the beam groups BG to BG incident to the reflection surface 231*a* increases, the deviation amount of the optical axis in the sub-scanning direction H of the reflected beam groups BG to BG is largely different between the case where the beam groups BG to BG are reflected on the reflection surface 231*a* at the time of incident-side image formation and the case where the beam groups BG to BG are reflected on the reflection surface 231*a* at the time of counter-incident-side image formation. Therefore, when the deviation of the optical axis is to be adjusted, if the adjustment is made in accordance with the state in which the light is reflected at the time of the incident-side image formation, the deviation of the optical axis becomes larger at the reflection at the time of the counter-incident-side image formation, while, on the contrary, if the adjustment is made in accordance with the state in which the light is reflected at the time of the counter-incident-side image formation, the deviation of the optical axis becomes larger at the reflection at the time of the incident-side image formation, which may cause color unevenness in the image formed on the sheet P.

Figure 15:
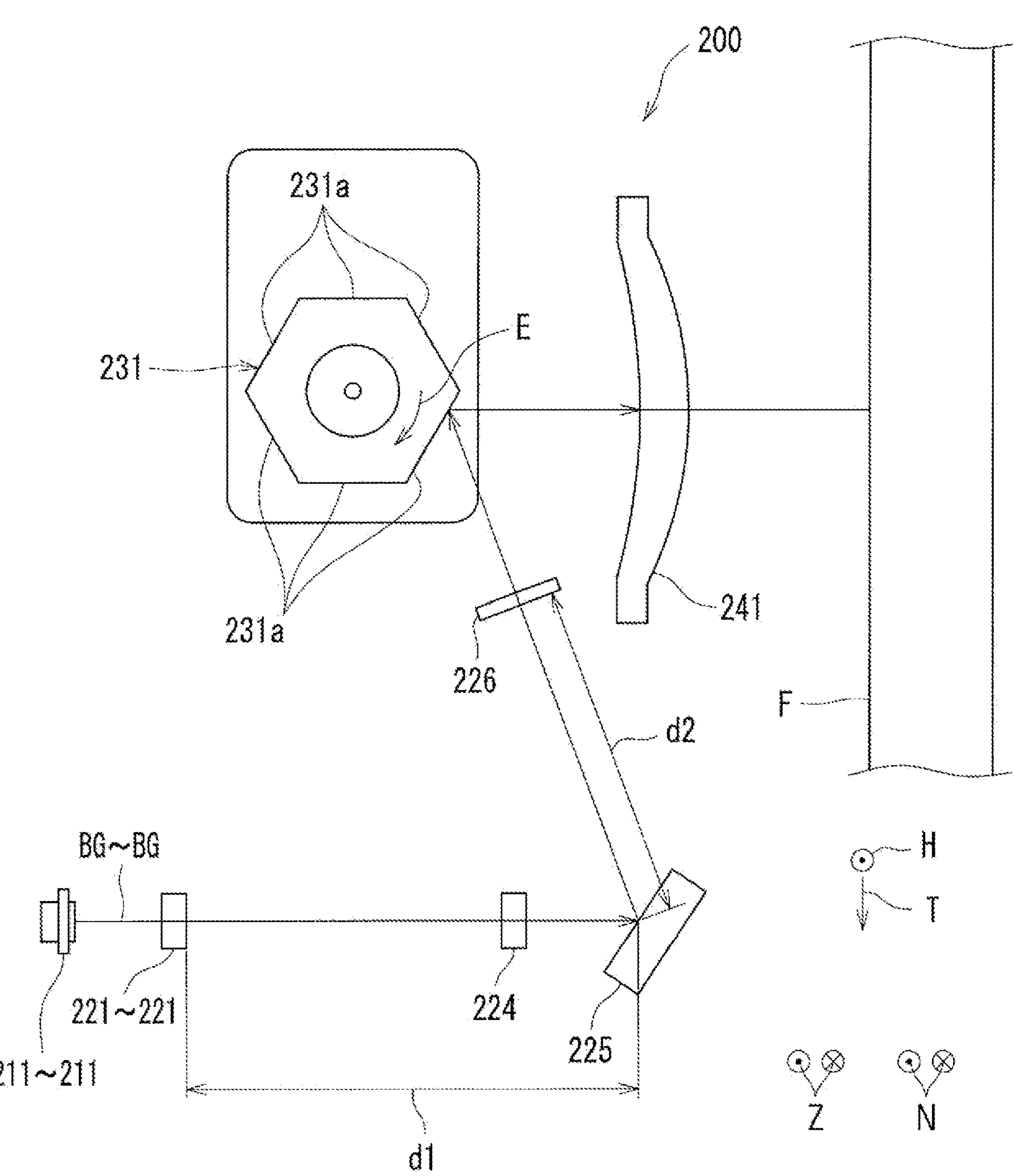
FIG. 15 is a plan view illustrating a schematic configuration of the optical scanning device in which the aperture is disposed between the cylindrical lens and the rotary polygon mirror.
Figure 16:
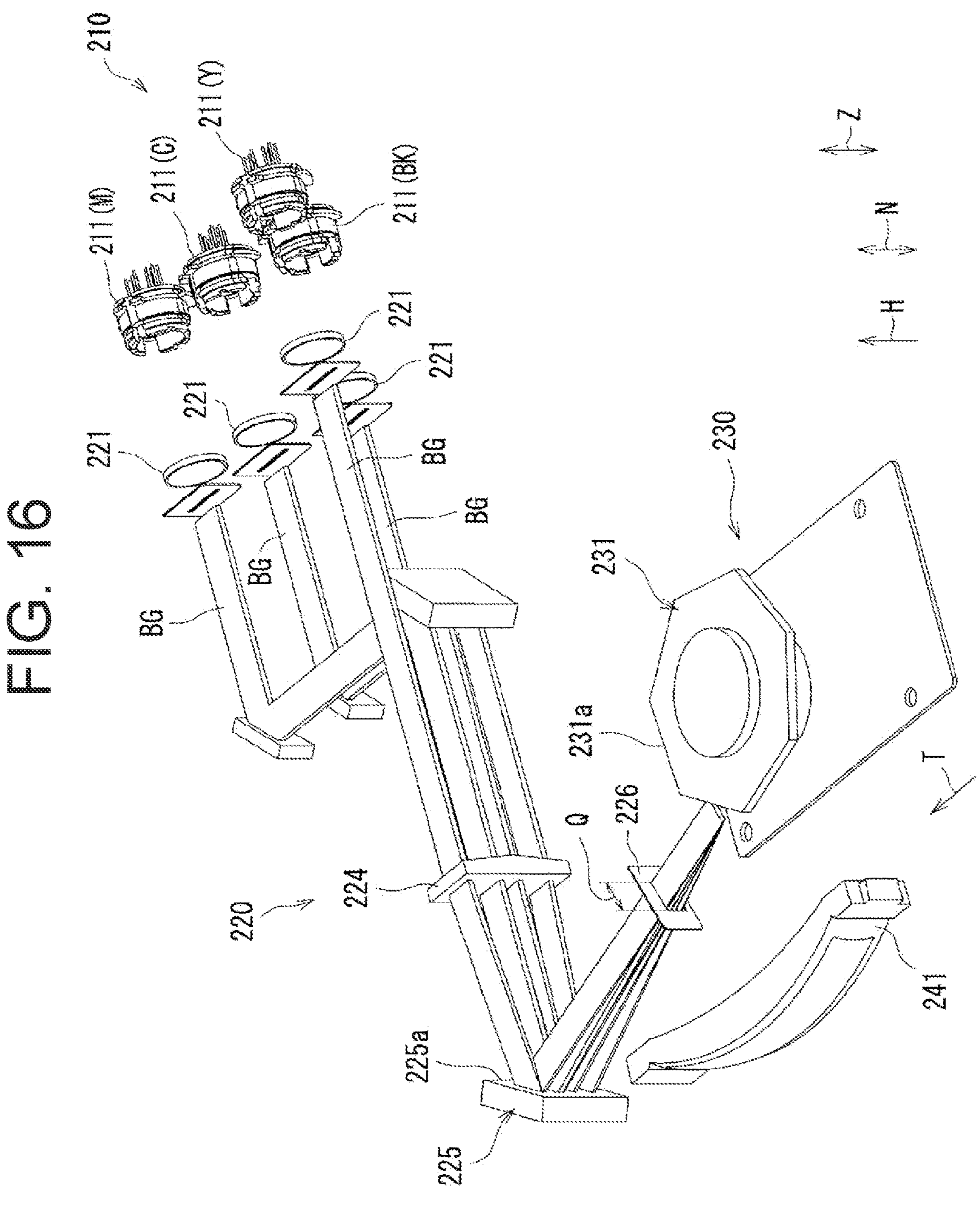
FIG. 16 is a perspective view illustrating a schematic configuration of the optical scanning device in which the aperture is disposed between the cylindrical lens and the rotary polygon mirror.

FIGS. 15 and 16 are a plan view and a perspective view, respectively, illustrating a schematic configuration of the optical scanning device 200 in which the aperture 226 is disposed between the cylindrical lens 224 and the rotary polygon mirror 231.

In this Embodiment, the optical scanning device 200 further includes the aperture 226. The aperture 226 is disposed between the cylindrical lens 224 and the rotary polygon mirror 231 and closer to the rotary polygon mirror 231 than the cylindrical lens 224. The aperture 226 is an optical member for narrowing the beam groups BG to BG incident to the reflection surface 231*a* of the rotary polygon mirror 231.

Here, the total of a distance d1 between the collimator lenses 221 to 221 and the reflection mirror 225 and a distance d2 between the reflection mirror 225 and the aperture 226 is a distance (d1+d2) between the collimator lenses 221 to 221 and the aperture 226 (see FIG. 15).

In the case of a configuration in which the beam groups BG to BG are diagonally incident to the reflection surface 231*a* in the sub-scanning direction H, as the pitch of the light emitting elements 212(1) to 212(*n*) in the main-scanning direction T becomes larger, the deviation of the optical axis in the plurality of beam groups BG to BG reflected on the reflection surface 231*a* is likely to become larger.

However, in the optical scanning device 200, as described above, since the aperture 226 is installed between the cylindrical lens 224 and the rotary polygon mirror 231, and the aperture 226 is disposed not on the cylindrical lens 224 side but on the rotary polygon mirror 231 side, the deviation amount of the optical axis described above can be suppressed. Specifically, since the beam groups BG to BG are narrowed by the aperture 226 immediately before incidence to the reflection surface 231*a* of the rotary polygon mirror 231, the deviation amount of the optical axis in the plurality of beam groups BG to BG incident to the reflection surface 231*a* is suppressed. As a result, the deviation amount of the optical axis in the plurality of beam groups BG to BG reflected on the reflection surface 231*a* can be suppressed.

That is, even in the configuration in which the plurality of beam groups BG to BG are diagonally incident to the reflection surface 231*a* of the rotary polygon mirror 231 in the sub-scanning direction H, the deviation of the optical axes of the plurality of beam groups BG to BG reflected on the reflection surface 231*a* can be suppressed. In particular, the deviation amount of the optical axis in the sub-scanning direction H of the reflected beam groups BG to BG can be suppressed in the case where the beam groups BG to BG are reflected on the reflection surface 231*a* at the time of the incident-side image formation and the case where the beam groups BG to BG are reflected on the reflection surface 231*a* at the time of the counter-incident-side image formation. As a result, the deviation amount can be adjusted easily, the difference in the deviation amount in the sub-scanning direction H can be suppressed easily, and a high-quality image in which color unevenness is unlikely to occur can be acquired.

Specifically, the beam groups BG to BG are narrowed by the aperture 226, but each member can be set such that light intensity of the beam groups BG to BG emitted from the aperture 226 is 30% or more of the light intensity (peak value) on the optical axis of the beam groups BG to BG. For example, the disposition of the members such as the aperture 226 and a value of an opening width Q of the aperture 226 in the main-scanning direction T can be set.

The present disclosure is not limited to the Embodiments described above but can be executed in various other forms. Therefore, such Embodiments are merely exemplification in all respects and should not be construed as limiting. The scope of the present disclosure is indicated by the scope of claims and is not bound in any way by the text of the Description. Moreover, all modifications and variations that come within the equivalent range of the scope of claims are within the scope of the present disclosure.

What is claimed is:

1. An optical scanning device comprising:

a multi-beam light source having a plurality of light emitting elements aligned in parallel in a predetermined linear direction;

a rotary polygon mirror; and a reflection mirror along a rotary axis direction of the rotary polygon mirror, a plurality of light beams emitted from each of the plurality of light emitting elements being reflected by the reflection mirror, the plurality of light beams reflected by the reflection mirror being made incident to the rotary polygon mirror, and the plurality of light beams reflected by the rotary polygon mirror being emitted toward an object to be scanned, wherein:

the optical scanning device further comprises a cylindrical lens that refracts the plurality of light beams and forms an image on a reflection surface of the rotary polygon mirror, the multi-beam light source is capable of rotationally adjusting around a rotational axis along an emission direction of the plurality of light beams, a rotational direction of the multi-beam light source around the rotational axis is made different, such that a sub-scanning width in a sub-scanning direction of the plurality of light beams is made smaller between:

one-side incidence in which the plurality of light beams is made incident to the rotary polygon mirror from either one of sides in the rotary axis direction of the rotary polygon mirror, and another-side incidence in which the plurality of light beams is made incident to the rotary polygon mirror from another one of the sides in the rotary axis direction of the rotary polygon mirror, and a difference in an optical path length, between a position of the cylindrical lens and a mirror surface of the reflection mirror, of light beams from light emitting elements at both ends, among the plurality of light emitting elements, is made smaller.

2. The optical scanning device according to claim 1, further comprising a collimator lens provided between the multi-beam light source and the reflection mirror, wherein the plurality of light emitting elements is rotationally adjusted to positions by rotating less than 90 degrees in a clockwise direction around the rotational axis from a predetermined reference adjustment position along an up-down direction when:

the rotary axis direction of the rotary polygon mirror is the up-down direction, the plurality of light beams is made incident from lower right and is reflected from the mirror surface of the reflection mirror toward upper left, viewed from a mirror surface side of the reflection mirror, and viewed from a side opposite the emission direction.

3. The optical scanning device according to claim 1, further comprising a collimator lens provided between the multi-beam light source and the reflection mirror, wherein the plurality of light emitting elements is rotationally adjusted to positions by rotating less than 90 degrees in a counterclockwise direction around the rotational axis from a predetermined reference adjustment position along an up-down direction when:

the rotary axis direction of the rotary polygon mirror as an is the up-down direction, the plurality of light beams is made incident from upper right and is reflected from the mirror surface of the reflection mirror toward lower left, viewed from a mirror surface side of the reflection mirror, and viewed from a side opposite the emission direction.

4. The optical scanning device according to claim 1, wherein an optical path pattern, formed by combining an optical path of each of the plurality of light beams incident to the reflection surface of the rotary polygon mirror, is asymmetric with respect to a reference virtual line passing through the reflection surface and orthogonal to a rotary axis of the rotary polygon mirror when viewed from a normal direction of the reflection surface of the rotary polygon mirror, the multi-beam light source emits, respectively, beam groups, each of which is composed of the plurality light beams, and two of the beam groups on an outer side are made incident to the reflection surface of the rotary polygon mirror at a same incident angle with respect to the reference virtual line, and the beam groups on an inner side are made incident to the reflection surface of the rotary polygon mirror at different incident angles with respect to the reference virtual line.

5. The optical scanning device according to claim 1, further comprising an aperture disposed between the cylindrical lens and the rotary polygon mirror and closer to the rotary polygon mirror than the cylindrical lens, wherein the aperture narrows the plurality of light beams incident to the reflection surface of the rotary polygon mirror.

6. An image forming apparatus comprising the optical scanning device according to claim 1.

* * * * *